US010038848B2

(12) United States Patent
Shintani

(10) Patent No.: US 10,038,848 B2
(45) Date of Patent: Jul. 31, 2018

(54) IMAGE BLUR CORRECTION DEVICE AND IMAGING DEVICE

(71) Applicant: Panasonic Intellectual Property Management Co., Ltd., Osaka (JP)

(72) Inventor: Dai Shintani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/589,258

(22) Filed: May 8, 2017

(65) Prior Publication Data

US 2017/0244898 A1    Aug. 24, 2017

Related U.S. Application Data

(63) Continuation of application No. PCT/JP2016/004516, filed on Oct. 7, 2016.

(30) Foreign Application Priority Data

Feb. 23, 2016 (JP) ................... 2016-031539

(51) Int. Cl.
*H04N 5/232* (2006.01)
*H02K 41/02* (2006.01)
(Continued)

(52) U.S. Cl.
CPC ....... *H04N 5/23264* (2013.01); *G02B 27/646* (2013.01); *H02K 41/02* (2013.01); *H04N 5/2253* (2013.01)

(58) Field of Classification Search
CPC ........... H04N 5/23264; H04N 5/23258; H04N 5/2253; H02K 41/02; G02B 27/646; G03B 17/02; G03B 5/00
See application file for complete search history.

(56) References Cited

U.S. PATENT DOCUMENTS 7,502,554 B2 *   3/2009   Enomoto ................. G03B 5/00
                                                        348/208.11
8,300,105 B2 *  10/2012   Byon .................. H04N 5/23258
                                                         348/208.7
(Continued)

FOREIGN PATENT DOCUMENTS

JP   2008-020704   1/2008
JP   2011-013301   1/2011
(Continued)

OTHER PUBLICATIONS

International Search Report of PCT application No. PCT/JP2016/004516 dated Dec. 27, 2016.

*Primary Examiner* — Hung Lam
(74) *Attorney, Agent, or Firm* — Renner Otto Boisselle & Sklar, LLP

(57) ABSTRACT

The image blur correction device is an image blur correction device that corrects a blur of an image of a subject to be captured, and includes a movable frame, a fixed frame, a plurality of connection members, a plurality of actuators, a pair of magnets, and a magnetic body. The movable frame is displaceable along a plane orthogonal to an optical axis. The fixed frame faces the movable frame. The plurality of connection members connects the fixed frame and the movable frame to each other, and supports the movable frame so as to be displaceable. The plurality of actuators changes the position of the movable frame according to displacement of the movable frame. The pair of magnets is mounted on one of the fixed frame and the movable frame, and includes a first magnetic pole and a second magnetic pole. The magnetic body is mounted on the other of the fixed frame and the movable frame, and disposed to face the pair of magnets. The magnetic body has a flat surface facing the pair of magnets, the flat surface having four sides. A first side out of the four sides is located across the first magnetic pole and the second magnetic pole of the pair of magnets, and a second
(Continued)

side intersecting the first side is located along one of the first magnetic pole and the second magnetic pole of the pair of magnets. The first side is linear, and the second side has a recessed shape or a protruded shape intersecting the first side.

14 Claims, 16 Drawing Sheets

(51) Int. Cl.
    *G02B 27/64*     (2006.01)
    *H04N 5/225*     (2006.01)

(56) References Cited

U.S. PATENT DOCUMENTS

| | | | |
|---|---|---|---|
| 9,332,184 B2* | 5/2016 | Okamura | H04N 5/2253 |
| 2006/0018646 A1* | 1/2006 | Stavely | G03B 17/02 396/55 |
| 2008/0048652 A1 | 2/2008 | Murakita | |
| 2008/0225126 A1* | 9/2008 | Mogamiya | H04N 5/2253 348/208.4 |
| 2011/0181740 A1 | 7/2011 | Watanabe et al. | |
| 2012/0020653 A1 | 1/2012 | Shintani | |
| 2013/0021685 A1* | 1/2013 | Fan | G02B 7/021 359/824 |
| 2013/0088607 A1* | 4/2013 | Akutsu | G03B 17/14 348/208.1 |

FOREIGN PATENT DOCUMENTS

| | | |
|---|---|---|
| JP | 2012-048215 | 3/2012 |
| JP | 2013-083753 | 5/2013 |
| JP | 2014-145855 | 8/2014 |

* cited by examiner

IMAGE BLUR CORRECTION DEVICE AND IMAGING DEVICE

BACKGROUND

1. Technical Field

The present disclosure relates to an image blur correction device including an imaging element and to an imaging device.

2. Description of the Related Art

Conventionally, imaging devices have widely been used which have, for the purpose of acquiring a clear captured image, mechanisms for correcting a blur of an optical image upon capturing an image (hereinafter referred to as "image blur correction mechanisms").

Such image blur correction mechanisms include optical image blur correction mechanisms and image blur correction mechanisms of a type in which imaging elements are driven. Optical image blur correction mechanisms drive a portion of or all of optical lenses in a plane perpendicular to an optical axis or in a direction tilted with respect to the optical axis for correction (for example, see PTL 1). Image blur correction mechanisms of a type in which imaging elements are driven drive imaging elements in a plane perpendicular to an optical axis for correction (for example, see PTL 2).

CITATION LIST

Patent Literature

PTL 1: Unexamined Japanese Patent Publication No. 2013-83753

PTL 2: Unexamined Japanese Patent Publication No. 2012-48215

SUMMARY

The present disclosure provides an image blur correction device effective for stably executing image blur correction.

The image blur correction device according to the present disclosure is an image blur correction device that corrects a blur of a subject image to be captured, and includes a movable frame, a fixed frame, a plurality of connection members, a plurality of actuators, a pair of magnets, and a magnetic body. The movable frame is displaceable along a plane orthogonal to an optical axis. The fixed frame faces the movable frame. The plurality of connection members connects the fixed frame and the movable frame to each other, and supports the movable frame so as to be displaceable. The plurality of actuators changes the position of the movable frame according to displacement of the movable frame. The pair of magnets is mounted on one of the fixed frame and the movable frame, and includes a first magnetic pole and a second magnetic pole. The magnetic body is mounted on the other of the fixed frame and the movable frame, and disposed to face the pair of magnets. The magnetic body further has a flat surface facing the pair of magnets, the flat surface having four sides. A first side of the four sides is located across the first magnetic pole and the second magnetic pole of the pair of magnets, and a second side intersecting the first side is located along one of the first magnetic pole and the second magnetic pole of the pair of magnets. The first side is linear, and the second side has a recessed shape or a protruded shape intersecting the first side. A number of the plurality of connection members is three or more, and the magnetic body is disposed in a region formed by line segments which connect each of the plurality of connection members.

The image blur correction device according to the present disclosure is effective for stably executing image blur correction.

DETAILED DESCRIPTION (Outline)

Figure 1:
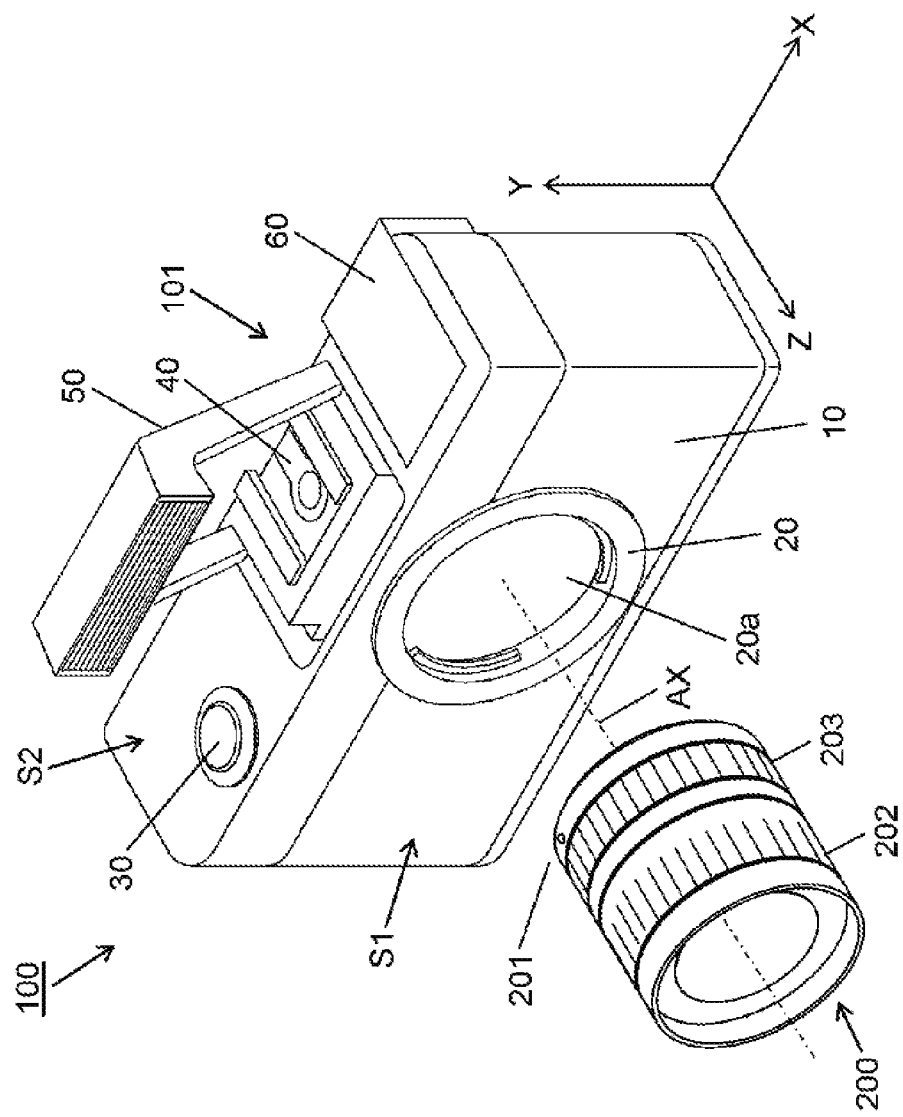
FIG. 1 is a perspective view of a digital camera according to a first exemplary embodiment of the present disclosure.

An imaging device (for example, a camera body) provided with an image blur correction mechanism of a type in which an imaging element is driven includes an imaging element which is mounted to a movable frame so as to be two-dimensionally displaceable, along with the movable frame, in a plane orthogonal to an optical axis. The imaging device calculates a displacement direction and a displacement amount of the imaging element in the plane from an output of an angular speed sensor provided in the body of the imaging device and, based on the calculated displacement amount, corrects a blur of a subject image formed on the imaging element by a photographing lens.

Herein, the displacement amount of the imaging element is an amount of movement of the imaging element in the plane orthogonal to the optical axis from a reference position (position of the imaging element which is not displaced) in the plane.

A drive device (actuator) of the imaging element has a fixed frame and a movable frame. The movable frame is held by a ball-and-roller bearing composed of at least three ball members. Therefore, force (drawing force) for biasing the movable frame toward the fixed frame through the ball members is required. Examples of a mechanism for applying this drawing force include biasing by means of a tension spring and magnetic attraction.

With the biasing by means of a tension spring, force of the spring is increased according to a displacement amount of the imaging element, so that not only biasing force for biasing the movable frame toward the fixed frame but also drawing force in the direction opposite to the displacement direction is increased. In addition, in the configuration using a tension spring, static contact between the movable frame and the fixed frame cannot be avoided, resulting in that friction caused by the displacement of the movable frame largely affects drive control. On the other hand, in the configuration using magnetic attraction, drawing force is decreased according to a displacement amount of the imaging element, contrary to the biasing by means of a spring, and force in the same level as the force by the spring is generated in the displacement direction. Therefore, both configurations have a problem that control for the actuator becomes extremely complicated.

In an image blur correction device according to a first exemplary embodiment described below, a shape of an attraction plate with respect to magnets is optimized so that an imaging element, which is two-dimensionally driven in a plane orthogonal to an optical axis of a photographing lens, is stably attracted in the direction of the optical axis.

Hereinafter, the first exemplary embodiment of the present disclosure will be described with reference to the drawings. In the description of the drawings to be referred to below, the same or similar components are identified by the same or similar reference marks. However, all the drawings are conceptual sketches and may not reflect actual dimensional proportions, etc. Therefore, information about specific dimensions, etc. should be determined from the description to be given hereafter. Keep in mind that dimensional proportional and other relationships may also differ from one drawing to another.

Now, a digital camera will be described in the exemplary embodiment below as one example of the "imaging device". In the description below, terms "front", "rear", "top", "bottom", "right", and "left" are used based on the imaging device which faces a subject in a landscape orientation, wherein the side close to the subject is defined as "front", and the side opposite to the subject, that is, the side close to a photographer, is defined as "rear".

First Exemplary Embodiment

[1-1. Configuration]
[1-1-1. Schematic Configuration of Imaging Device]

Figure 2:
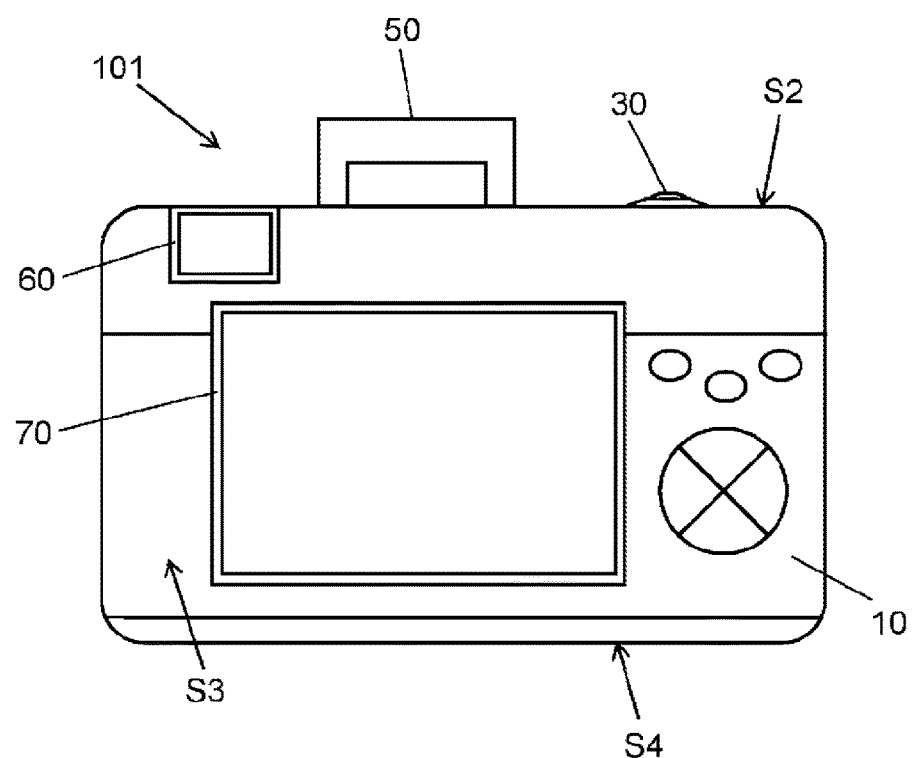
FIG. 2 is a front view of the digital camera according to the first exemplary embodiment of the present disclosure.

The schematic configuration of digital camera 100 according to the first exemplary embodiment will be described with reference to the drawings. FIG. 1 is a perspective view of digital camera 100 according to the first exemplary embodiment of the present disclosure. FIG. 2 is a front view of digital camera 100 according to the first exemplary embodiment of the present disclosure.

As illustrated in FIGS. 1 and 2, digital camera 100 includes camera body 101 and lens unit 200.

Camera body 101 (one example of the imaging device) includes housing 10, body mount 20, shutter button 30, hot shoe 40, flash emitter 50, electronic viewfinder 60, and display device 70. Housing 10 stores image blur correction device 1 (see FIG. 3), and the like. Housing 10 has front surface 51, top surface S2, rear surface S3, and bottom surface S4. Body mount 20 is provided on front surface 51 of housing 10. Lens unit 200 can be attached to body mount 20 by means of bayonet connection or the like. Body mount 20 has opening 20a around optical axis AX of lens unit 200. Incidence light from lens unit 200 is guided inside housing 10 through opening 20a. Shutter button 30 is mounted on top surface S2 of housing 10. Shutter button 30 receives an open/close operation of a shutter from a user.

Hot shoe 40 is provided on top surface S2 of housing 10. A general-purpose external component (such as a flash emission device, for example) can be attached to hot shoe 40. Flash emitter 50 is provided on top surface S2 of housing 10. Flash emitter 50 can be stored in housing 10. Note that FIGS. 1 and 2 illustrate the state in which flash emitter 50 is pulled out of housing 10. Electronic viewfinder 60 is provided on rear surface S3 of housing 10. Electronic viewfinder 60 displays an image in a photographing range. A photographer can observe an image displayed on electronic viewfinder 60. Display device 70 is provided on rear surface S3 of housing 10. Display device 70 displays an image in the photographing range, an operation menu, or the like. Examples of usable display device 70 include a liquid crystal display, an organic electroluminescence (EL) display, and an inorganic EL display.

Digital camera 100 also includes inside a shutter unit (not illustrated), image blur correction device 1 (FIG. 3), imaging element 12 (FIG. 4), circuit board 13 (FIG. 4), control circuit board (not illustrated), and the like. Imaging element 12 is composed of a complementary metal oxide semiconductor (CMOS) image sensor, and a charge coupled device (CCD) image sensor, for example.

Note that digital camera 100 illustrated in FIG. 1 is merely one example, and the imaging device is not limited to this example. For example, the imaging device may not be a lens interchangeable camera, but may be a lens integrated camera or a single-lens reflex camera.

Lens unit 200 (one example of the imaging device) illustrated in FIG. 1 is a lens interchangeable unit, and includes lens mount 201 mounted to body mount 20 of camera body 101, focus ring 202 serving as an operation unit for driving a focus lens, and zoom ring 203 serving as an operation unit for driving a zoom lens. Lens unit 200 also includes inside a lens controller, an optical system including the focus lens and the zoom lens, a focus lens driver, a zoom lens driver, a zoom ring, a diaphragm, a diaphragm driver, a dynamic random access memory (DRAM), a flash memory, and the like, those of which are not illustrated in the drawings.

Light from a subject enters camera body 101 through the optical system inside of lens unit 200, and is received by a light-receiving surface of imaging element 12. An optical image received by imaging element 12 is converted into an electric signal, that is, image data. The image data is subjected to predetermined processes (for example, analog/digital (AD) conversion) by circuit board 13 that executes a predetermined program, and displayed on display device 70 by the control circuit board not illustrated.

[1-1-2. Schematic Configuration of Image Blur Correction Device]

The schematic configuration of image blur correction device 1 according to the first exemplary embodiment will be described with reference to the drawings.

Figure 3:
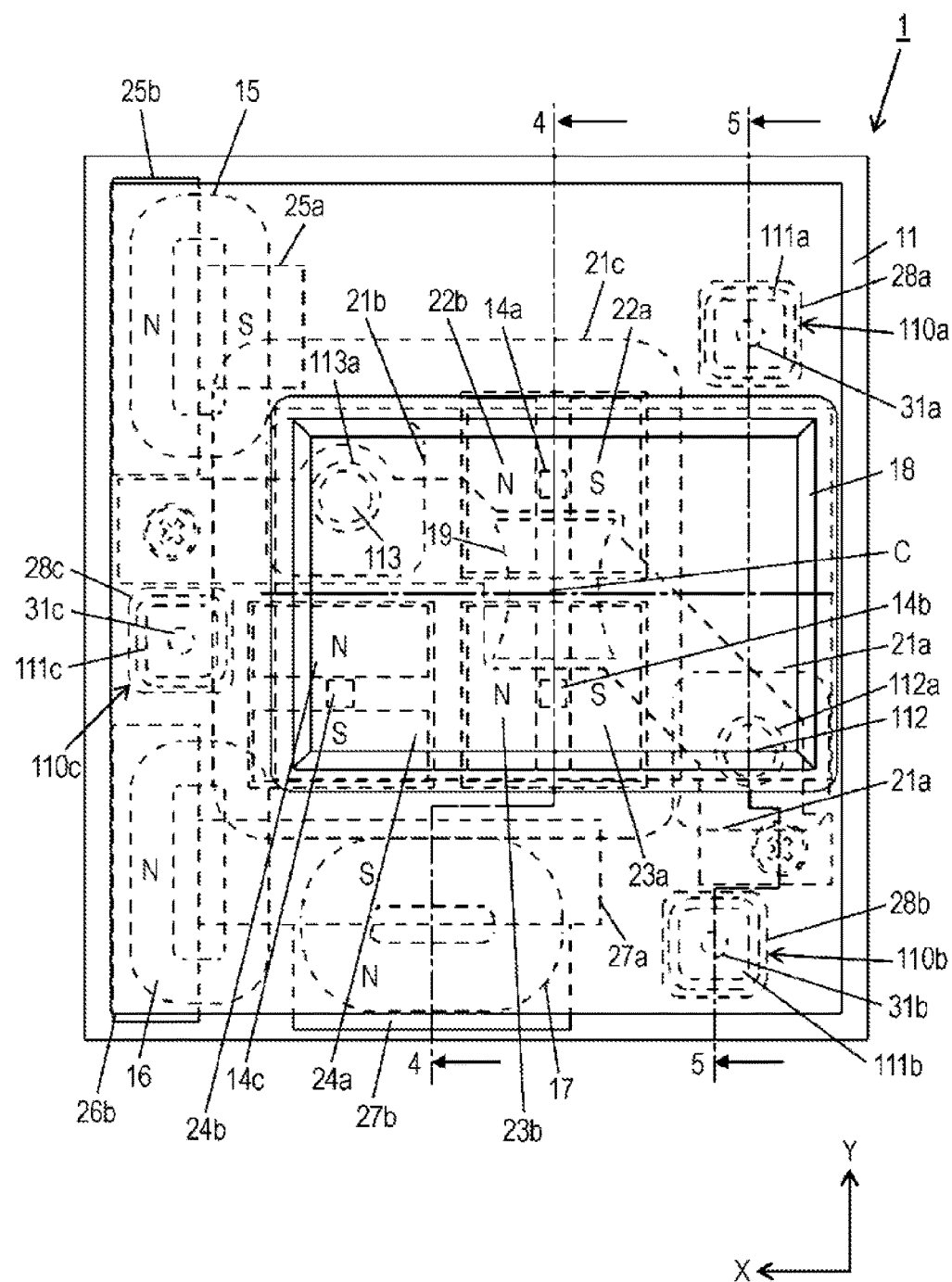
FIG. 3 is a front view of an image blur correction device according to the first exemplary embodiment of the present disclosure.
Figure 4:
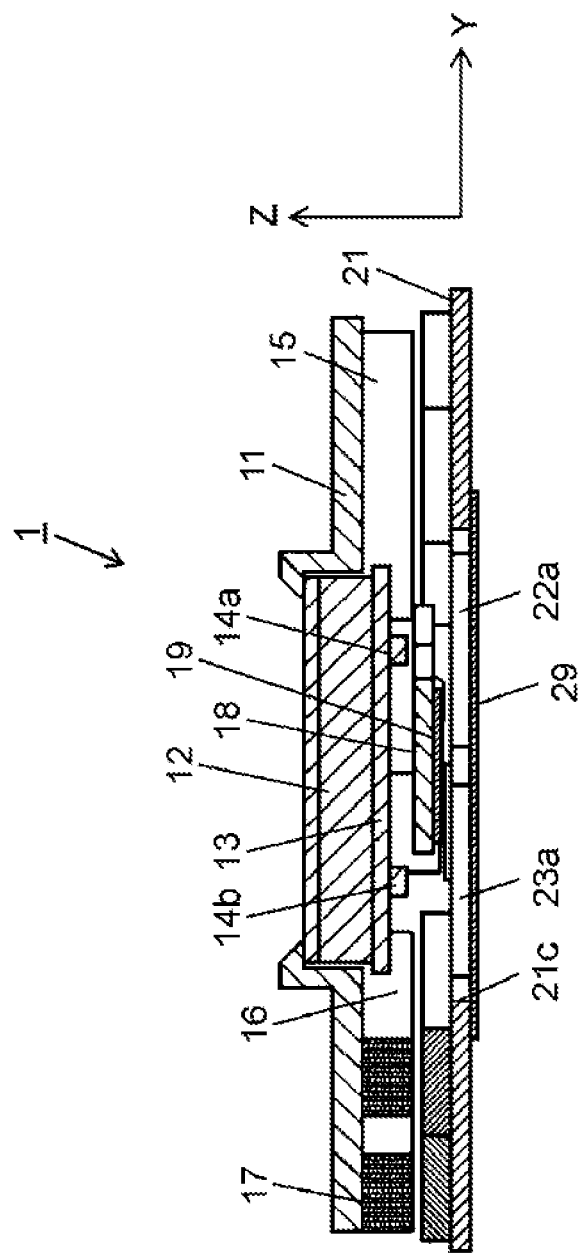
FIG. 4 is a sectional view taken along line 4-4 in FIG. 3.
Figure 5:
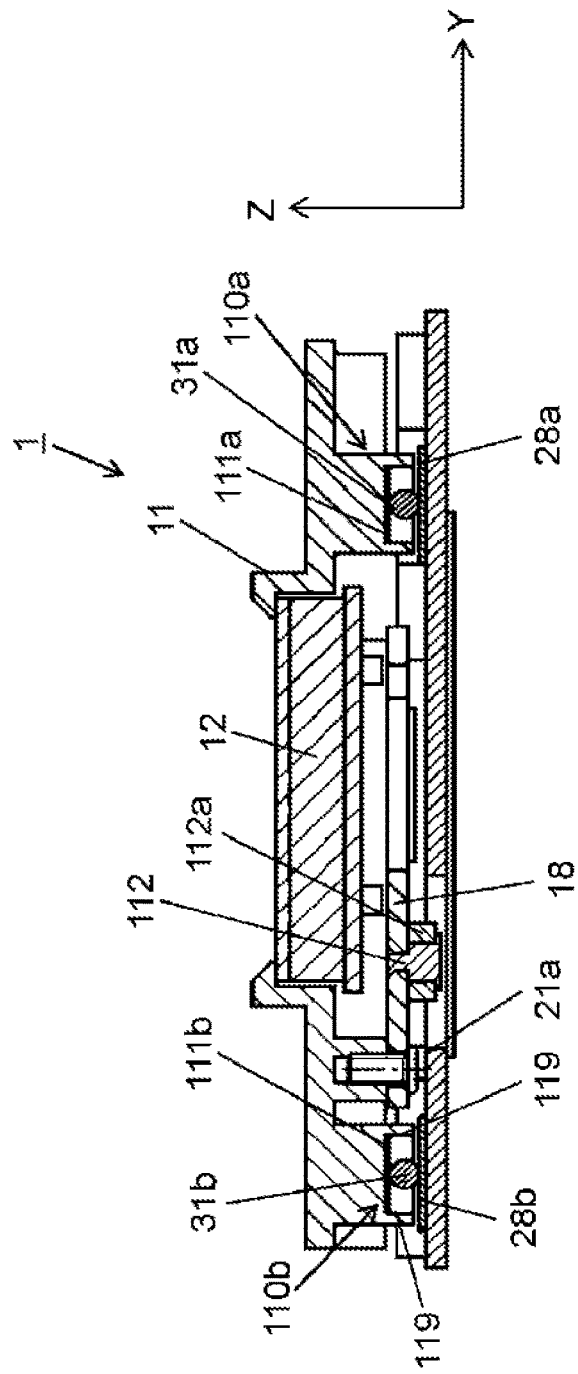
FIG. 5 is a sectional view taken along line 5-5 in FIG. 3.

FIG. 3 is a front view of image blur correction device 1 according to the first exemplary embodiment of the present disclosure. FIG. 4 is a sectional view taken along line 4-4 in FIG. 3. FIG. 5 is a sectional view taken along line 5-5 in FIG. 3.

Image blur correction device 1 according to the first exemplary embodiment will be described with reference to FIGS. 3, 4, and 5. Image blur correction device 1 includes a drive mechanism for driving imaging element 12.

As illustrated in FIGS. 3 and 4, image blur correction device 1 mainly includes movable frame 11, circuit board 13, ball holders 110a, 110b, 110c, drive coils 15, 16, 17, drive magnets 25a and 25b, 26b, 27a and 27b, magnetic displacement detection sensors 14a, 14b, 14c, sensor magnets 22a and 22b, 23a and 23b, 24a and 24b, irregular-shaped attraction plate 19, and fixed holding member 21. Circuit board 13, ball holders 110a, 110b, 110c, drive coils 15, 16, 17, magnetic displacement detection sensors 14a, 14b, 14c, and irregular-shaped attraction plate 19 are mounted on movable frame 11. Drive magnets 25a and 25b, 26b, 27a and 27b, and sensor magnets 22a and 22b, 23a and 23b, 24a and 24b are mounted on fixed holding member 21.

Movable frame 11 (one example of the movable frame) holds imaging element 12, and is disposed to face fixed holding member 21. Circuit board 13 is electrically connected to imaging element 12 to convert an electric signal from imaging element 12 from an analog signal to a digital signal. Movable frame 11 holds imaging element 12 so as to be movable in a direction orthogonal to optical axis AX. Ball holders 110a, 110b, 110c hold ball members 31a, 31b, 31c (one example of the connection member) that connect movable frame 11 to fixed holding member 21. Ball members 31a, 31b, 31c support movable frame 11 so as to be displaceable with respect to fixed holding member 21. The detail of ball holders 110a, 110b, 110c will be described later.

Three drive coils 15, 16, 17 are fixedly bonded to movable frame 11. The terminals of the drive coils are soldered onto circuit board 13 electrically connected to imaging element 12. The terminals of the drive coils are fed with electricity from circuit board 13. Three drive coils 15, 16, 17, a pair of drive magnets 25a and 25b disposed to face drive coil 15 in the optical axis direction, a pair of drive magnets 26b and 27a disposed to face drive coil 16 in the optical axis direction, and a pair of drive magnets 27a and 27b disposed to face drive coil 17 in the optical axis direction constitute actuators (one example of the actuator) that drive imaging element 12. It is to be noted that, in the present exemplary embodiment, drive magnets 25a, 27a are magnetized to an S pole on the side facing drive coils 15, 16, 17, and drive magnets 25b, 26b, 27b are magnetized to an N pole on the side facing drive coils 15, 16, 17.

Three magnetic displacement detection sensors 14a, 14b, 14c (one example of the displacement detector) are disposed on circuit board 13. Magnetic displacement detection sensors 14a, 14b, 14c are composed of Hall elements, for example. Sensor magnets 22a and 22b, 23a and 23b, 24a and 24b (one example of a plurality of pairs of magnets) which respectively face magnetic displacement detection sensors 14a, 14b, 14c in the optical axis direction are provided on fixed holding member 21 facing magnetic displacement detection sensors 14a, 14b, 14c. Magnetic displacement detection sensors 14a, 14b, 14c, sensor magnets 22a and 22b, 23a and 23b, 24a and 24b detect displacement of imaging element 12. Sensor magnets 22a, 23a, 24a are magnetized to an S pole (one example of one of a first magnetic pole and a second magnetic pole) on the side facing movable frame 11, and sensor magnets 22b, 23b, 24b are magnetized to an N pole (one example of the other of the first magnetic pole and the second magnetic pole) on the side facing movable frame 11.

Irregular-shaped attraction plate 19 (one example of the magnetic body) is formed from a magnetic body such as a metal plate, has a rectangular shape, and is disposed such that the four sides of irregular-shaped attraction plate 19 coincide with the X-axis direction and the Y-axis direction. A pair of facing sides out of the four sides of irregular-shaped attraction plate 19 has a shape of a concave circular arc.

Irregular-shaped attraction plate 19 is disposed on movable frame 11 facing sensor magnets 22a and 22b (one example of the first pair of magnets), 23a and 23b (one example of the second pair of magnets). Irregular-shaped attraction plate 19 attracts movable frame 11 toward fixed holding member 21 by utilizing magnetic force of sensor magnets 22a, 22b, 23a, 23b. This enables ball members 31a, 31b, 31c held by later-described ball holders 110a, 110b, 110c to be biased toward fixed holding member 21.

Fixed holding member 21 (one example of the fixed frame) is fixed on a support frame (not illustrated) in camera body 101.

Imaging element 12 driven by the drive mechanism described above is fixed to movable frame 11 by bonding or the like. Imaging element 12 is electrically connected to circuit board 13.

[1-1-3. Ball Holder]

As illustrated in FIGS. 3 and 5, ball holders 110a, 110b, 110c, which are rectangular in a plan view, are provided on three locations of movable frame 11. In each of ball holders 110a, 110b, 110c, the surface with which each of ball members 31a, 31b, 31c is in contact (hereinafter referred to as a ball contact surface) is orthogonal to optical axis AX. Movable metal plates 111a, 111b, 111c which have smooth surfaces and are non-magnetic as much as possible are disposed on the ball contact surfaces. Ball members 31a, 31b, 31c are formed from a nonmetallic material having high rigidity, such as zirconia. In addition, fixed holding member 21 has a smooth surface substantially orthogonal to optical axis AX on the positions facing ball members 31a, 31b, 31c.

Fixed metal plates 28a, 28b, 28c which are non-magnetic as much as possible are fixed on fixed holding member 21 by bonding or the like.

[1-1-4. Actuator]

Actuators are respectively composed of drive coils 15, 16, 17, and drive magnets 25a and 25b, 27a and 26b, 27a and 27b, which are described below. The actuators can correct an image blur caused by the movement of camera body 101 by changing the position of movable frame 11.

Three pairs of drive magnets 25a and 25b, 27a and 26b, 27a and 27b are disposed on fixed holding member 21, which are provided on the rear surface side of imaging element 12, so as to respectively face drive coils 15, 16, 17. Each of drive coils 15, 16, 17 moves from the central position with respect to the corresponding pair out of three pairs of drive magnets 25a and 25b, 27a and 26b, 27a and 27b, according to the electricity feeding direction from circuit board 13. The drive coils are disposed on three locations in order that the rotational drive about the Z axis illustrated in the drawings is enabled in the plane orthogonal to optical axis AX. Specifically, electricity for driving drive coil 15 in the X+ direction (direction of arrow X) illustrated in FIG. 3 is supplied to drive coil 15, and electricity for driving drive coil 16 in the X− direction is supplied to drive coil 16. At that time, the rotation around the Z axis is caused, but the rotation center is not determined. Therefore, the rotation center can be determined according to the amount and direction of electricity to be supplied to drive coil 17. In addition, if the rotational drive around the Z axis is unnecessary, electricity with the phase in the same direction is supplied to drive coils 15 and 16 to drive movable frame 11 in a yaw direction, and the drive in a pitch direction is enabled by supplying electricity to drive coil 17. However, it is difficult to align the position of center of gravity of movable frame 11 with the center of gravity of driving force. Therefore, the amount and direction of electricity to be supplied to each drive coil is controlled, according to outputs of the displacement detectors described later, to enable movable frame 11 to be driven in the yaw direction, pitch direction, and a roll direction.

[1-1-5. Displacement Detection Mechanism]

Displacement detection mechanism is composed of magnetic displacement detection sensors 14a, 14b, 14c, and sensor magnets 22a and 22b, 23a and 23b, 24a and 24b, which are described below.

Magnetic displacement detection sensors 14a, 14b, 14c are disposed on three locations on circuit board 13 on the rear surface side (opposite to the subject) of imaging element 12. Each of the sensors detects the displacement of imaging element 12 in at least one of the yaw direction and the pitch direction. Another magnetic displacement detection sensor is disposed in the yaw direction or in the pitch direction. In the present exemplary embodiment, magnetic displacement detection sensors 14a, 14b are disposed on two locations for the detection in the yaw direction, and magnetic displacement detection sensor 14c is disposed on one location for the detection in the pitch direction. In this case, intermediate point C on the line connecting magnetic displacement detection sensors 14a, 14b that detect the displacement in the yaw direction is defined as substantially the center of imaging element 12 when a later-described magnetic attraction mechanism is formed. In addition, a pair of sensor magnets 22a and 22b, a pair of sensor magnets 23a and 23b, and a pair of sensor magnets 24a and 24b are respectively disposed on fixed holding member 21 at positions respectively corresponding to magnetic displacement detection sensors 14a, 14b, 14c. Three pairs of sensor magnets 22a and 22b, 23a and 23b, 24a and 24b are fixed on sensor magnet yoke plate 29 fixed on fixed holding member 21 by bonding or the like as illustrated in FIG. 4.

In the present exemplary embodiment, sensor magnets 22a and 22b, 23a and 23b, 24a and 24b are disposed in hole 21c formed on fixed holding member 21. This is because a space for the later-described magnetic attraction mechanism is ensured. If there is a sufficient space, sensor magnets 22a and 22b, 23a and 23b, 24a and 24b may be directly fixed to fixed holding member 21.

According to the displacement detection mechanism described above, the displacement of imaging element 12 in at least the yaw direction, the pitch direction, and the roll direction can precisely be detected.

[1-1-6. Magnetic Attraction Mechanism]

The magnetic attraction mechanism is composed of irregular-shaped attraction plate 19 and sensor magnets 22a and 22b, 23a and 23b, which are described below.

Unless imaging element 12 is always pressed toward fixed holding member 21, ball members 31a, 31b, 31c in ball holders 110a, 110b, 110c might fall, and therefore, it is likely that smooth drive due to rolling cannot be achieved. In view of this, in the present exemplary embodiment, attraction force is applied between irregular-shaped attraction plate 19 and sensor magnets 22a and 22b, 23a and 23b by utilizing magnetic force of sensor magnets 22a and 22b, 23a and 23b, 24a and 24b to the side facing magnetic displacement detection sensors 14a, 14b, 14c. According to this configuration, as the problem due to the conventional tension spring can be solved and the space for disposing the spring is not needed, a compact image blur correction device having high controllability can be implemented.

Specifically, irregular-shaped attraction plate 19 is fixed, by bonding or the like, on holding member 18 attached to movable frame 11. Irregular-shaped attraction plate 19 is disposed to be held on the central position in the movable range of imaging element 12, and such that the center of irregular-shaped attraction plate 19 coincides with center C of a gap surrounded by sensor magnets 22a, 22b, 23a, 23b on the plane orthogonal to optical axis AX and the four sides of irregular-shaped attraction plate 19 coincides with the yaw direction and the pitch direction. In addition, imaging element 12, circuit board 13, magnetic displacement detection sensors 14a, 14b, 14c, holding member 18, irregular-shaped attraction plat 19, and sensor magnets 22a and 22b, 23a and 23b, 24a and 24b are disposed along the direction of optical axis AX in this order. These components are fixed on movable frame 11 by means of screw fastening or the like. According to this configuration, attraction by irregular-shaped attraction plate 19 is enabled on substantially the center of imaging element 12, that is, near optical axis AX. Therefore, stable attraction force can be maintained even when imaging element 12 is displaced.

[1-1-7. Movement Restriction Mechanism]

The movement restriction mechanism is composed of restriction shafts 112, 113 and restriction holes 21a, 21b, which are described below.

As described with respect to ball holders 110a, 110b, 110c, when ball members 31a, 31b, 31c are in contact with erecting walls 119 (FIG. 5) of rectangular ball holders 110a, 110b, 110c due to the displacement of imaging element 12, friction load more than rolling load is caused. Note that erecting walls 119 are surfaces enclosing ball members 31a, 31b, 31c and substantially parallel to optical axis AX, out of surfaces forming ball holders 110a, 110b, 110c. The friction load becomes a variation element for the drive force of the actuators, so that it is difficult to perform precise image blur correction control. In addition, if unexpected impact or the like is applied, there is concern that ball members 31a, 31b, 31c fall by climbing over erecting walls 119.

In view of this, restriction shafts 112, 113 supported by holding member 18 are mounted as illustrated in FIGS. 3 and 5. Restriction shafts 112, 113 are mounted in restriction holes 21a, 21b formed on fixed holding member 21. Restriction shafts 112, 113 are provided with buffer rings 112a, 113a to prevent the generation of abnormal noise when restriction shafts 112, 113 are brought into contact with the walls of restriction holes 21a, 21b. Restriction shafts 112, 113 are in contact with the end faces of restriction holes 21a, 21b through buffer rings 112a, 113a.

[1-2. Operation]

Hereinafter, the operation of image blur correction device 1 according to the present exemplary embodiment will be described.

[1-2-1. Image Blur Correction Operation]

If the optical axis of light from the subject is displaced from the center of imaging element 12 due to the movement of camera body 101 during image-capturing by digital camera 100, the displacement direction and the displacement amount of imaging element 12 in the left-right direction, top-bottom direction, yaw direction, pitch direction, and roll direction are detected by magnetic displacement detection sensors 14a, 14b, 14c. When the displacement direction and displacement amount which have been detected are measured by circuit board 13, circuit board 13 supplies electricity to drive coils 15, 16, 17 according to the measurement result. At that time, circuit board 13 supplies electricity to at least one of drive coils 15, 16, 17 according to the displacement amount and displacement direction which have been measured. According to this electric supply, magnetic force for corresponding drive magnets 25a and 25b, 27a and 26b, 27a and 27b is changed, and hence movable frame 11 is moved. Thus, imaging element 12 fixed to movable frame 11 is displaced in a direction and an amount to correct the image blur.

[1-2-2. Operation of Magnetic Attraction Mechanism]

During the blur correction operation described above, movable frame 11 is displaced with respect to fixed holding member 21, so that the magnetic force of the attraction plate relative to the sensor magnets is changed.

[1-2-2-1. Relation Between Displacement and Returning Force Based on Shape of Attraction Plate]

Figure 6:
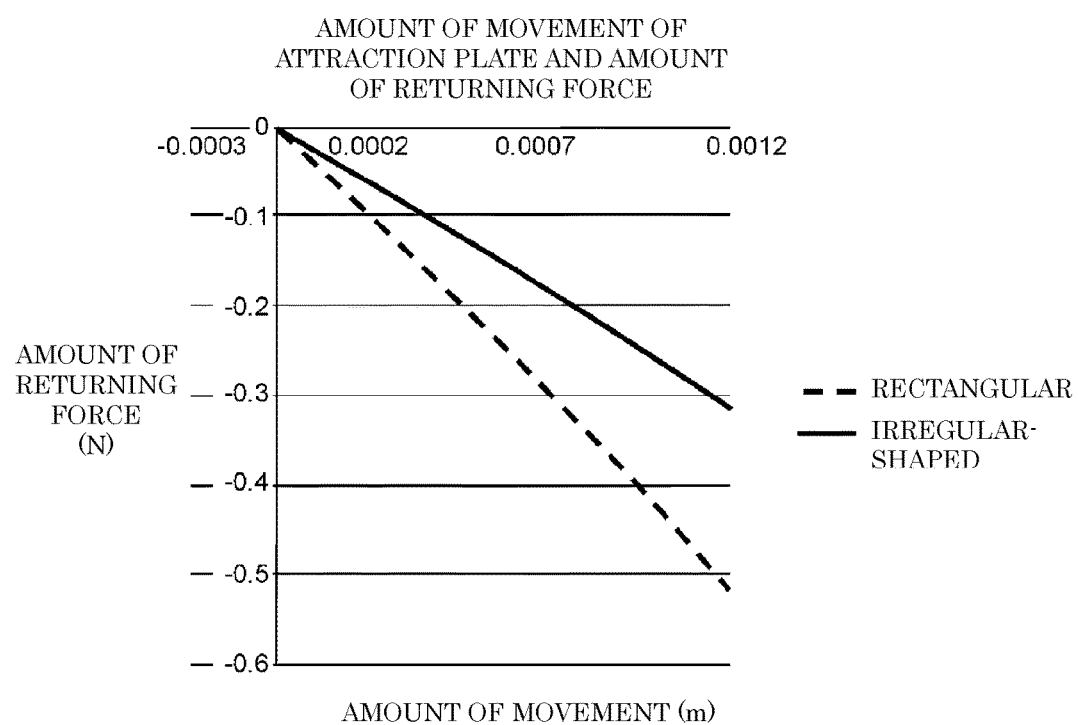
FIG. 6 is a graph illustrating a relation between an amount of movement and an amount of returning force, for returning to a central position, of an irregular-shaped attraction plate in the image blur correction device according to the first exemplary embodiment of the present disclosure.

FIG. 6 is a graph illustrating a relation between an amount of movement and an amount of returning force, for returning to a central position, of irregular-shaped attraction plate 19 in image blur correction device 1 according to the first exemplary embodiment of the present disclosure.

The graph in FIG. 6 shows the relation between a displacement amount (amount of movement) of the attraction plate and returning force thereof in the direction orthogonal to optical axis AX. The present exemplary embodiment shows the result obtained by comparing a rectangular attraction plate with a size of 8 mm×7 mm (quadrilateral in which all corners are right-angled) and irregular-shaped attraction plate 19 (FIG. 3) formed such that both 8-mm sides are recessed by 1.5 mm in a circular arc.

As is apparent from FIG. 6, the change in the returning force with respect to the change in the amount of movement is smaller in irregular-shaped attraction plate 19 than in the rectangular attraction plate. This result shows that, during the image blur correction operation, even if irregular-shaped attraction plate 19 fixed on movable frame 11 is greatly displaced with respect to sensor magnets 22a and 22b, 23a and 23b mounted to fixed holding member 21, the change in the attraction force by irregular-shaped attraction plate 19 is small. Thus, the attraction force by the magnetic attraction mechanism according to the present exemplary embodiment is stably obtained, and thus, ball holders 110a, 110b, 110c can stably hold ball members 31a, 31b, 31c. Consequently, the image blur correction operation can stably be executed.

Figure 7:
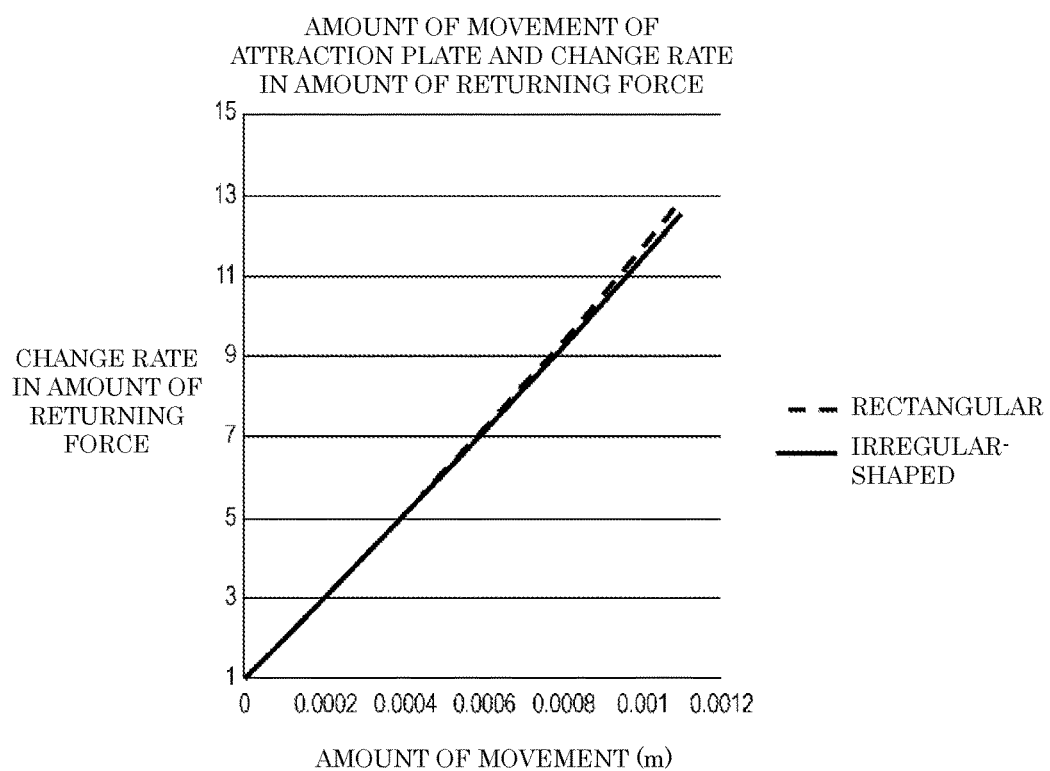
FIG. 7 is a graph illustrating a relation between an amount of movement and a change rate of an amount of returning force, for returning to the central position, of the irregular-shaped attraction plate in the image blur correction device according to the first exemplary embodiment of the present disclosure.

FIG. 7 is a graph illustrating a relation between an amount of movement of the irregular-shaped attraction plate and a change rate of an amount of returning force of this plate for returning to the central position in the image blur correction device according to the first exemplary embodiment of the present disclosure.

The graph in FIG. 7 shows the relation between a displacement amount (amount of movement) of the attraction plate and a change rate in the returning force of this plate. This graph shows that the change rate in the returning force is more linear in the irregular-shaped attraction plate. That is, it is found that a voltage control calculation for the displacement amount is easier in control of changing electric supply.

The reason for this will specifically be described below.

[1-2-2-2. Effect by Rectangular Attraction Plate]

Hereinafter, the magnetic attraction mechanism including irregular-shaped attraction plate 19 according to the present exemplary embodiment will be described with reference to FIGS. 8A to 8C.

Figure 8A:
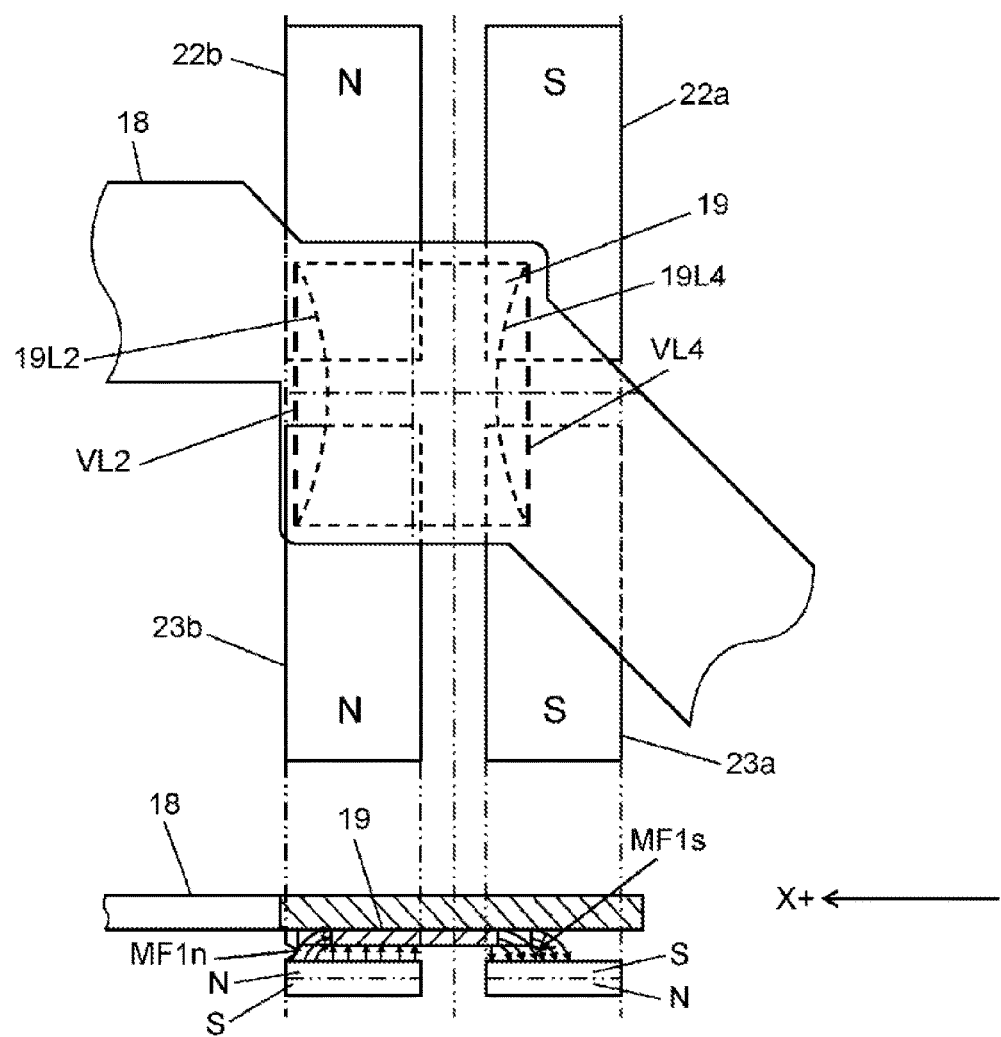
FIG. 8A is a view illustrating a state in which the irregular-shaped attraction plate is displaced toward one side with respect to sensor magnets in the image blur correction device according to the first exemplary embodiment of the present disclosure.

FIG. 8A is a view illustrating a state in which irregular-shaped attraction plate 19 is displaced toward one side with respect to sensor magnets 22a and 22b, 23a and 23b in image blur correction device 1 according to the first exemplary embodiment of the present disclosure. FIG. 8B is a view illustrating a state in which irregular-shaped attraction plate 19 is located on the center with respect to sensor magnets 22a and 22b, 23a and 23b in image blur correction device 1. FIG. 8C is a view illustrating a state in which irregular-shaped attraction plate 19 is displaced toward the other side with respect to sensor magnets 22a and 22b, 23a and 23b in image blur correction device 1.

Figure 8B:
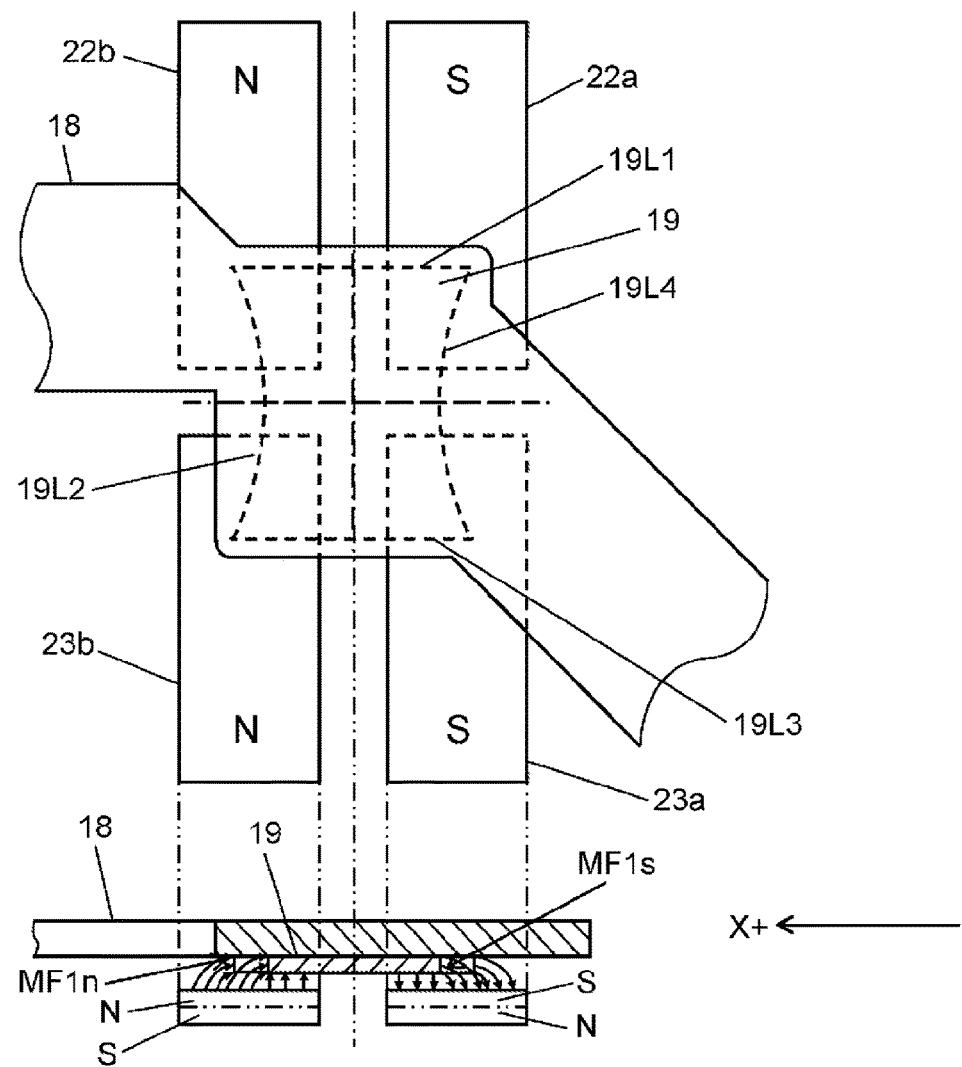
FIG. 8B is a view illustrating a state in which the irregular-shaped attraction plate is located on a central position with respect to the sensor magnets in the image blur correction device according to the first exemplary embodiment of the present disclosure.

FIG. 8B illustrates the state in which irregular-shaped attraction plate 19 is in a magnetic equilibrium position. As illustrated in FIG. 8B, irregular-shaped attraction plate 19 has a line-symmetric shape, and has a flat surface facing sensor magnets 22a, 22b, 23a, 23b. Out of four sides of the flat surface, linear side 19L1 (one example of a first side) is located across S-pole sensor magnet 22a and N-pole sensor magnet 22b. Linear side 19L3 (one example of a third side) facing side 19L1 is located across S-pole sensor magnet 23a and N-pole sensor magnet 23b. Recessed side 19L2 (one example of a second side) intersecting side 19L1 is located across N-pole sensor magnet 22b and N-pole sensor magnet 23b. Side 19L4 (one example of a fourth side) facing side 19L2 is located across S-pole sensor magnet 22a and S-pole sensor magnet 23a.

If the attraction plate is rectangular, and the displacement amount of this attraction plate is increased, attraction force in the direction of optical axis AX is rapidly decreased. Therefore, force for returning to the magnetic equilibrium position (intermediate point C illustrated in FIG. 3 in the present exemplary embodiment) in the direction orthogonal to optical axis AX is rapidly increased. Attraction force is generated in proportion to the area of the attraction plate. Due to the displacement, leakage magnetic flux in the thickness direction of the attraction plate is increased, so that the attraction force for the magnets on one side is increased, and the leakage magnetic flux by the magnets on the other side is decreased, so that the attraction force is reduced. Thus, the difference in the attraction force is caused according to the displacement amount of the attraction plate, resulting in that the returning force in the direction orthogonal to optical axis AX is generated. In this case, the electric supply to the actuators needs to be changed according to the detection of the displacement amount. However, it is extremely difficult to perform expected control for the rapid variation in the returning force.

FIG. 8A illustrates the state in which the attraction plate is displaced in the X+ direction. If the attraction plate is rectangular, the end face of side VL2 in the X+ direction is located near the end faces of sensor magnets 22b, 23b. Therefore, leakage magnetic flux MF1n applied to the end face of side VL2 is smaller than leakage magnetic flux MF1s applied to the end face of side VL4 facing side VL2. Accordingly, force for returning in the X− direction is exerted on the attraction plate due to the difference in the attraction force. On the other hand, in irregular-shaped attraction plate 19, the end face of side 19L2 in the X+ direction is located near the end faces of sensor magnets 22b, 23b, but due to the recessed shape, leakage magnetic flux MF1n applied on the end face of side 19L2 is larger than that of the rectangular attraction plate. Thus, the returning force in the X− direction due to the difference in the attraction force is relatively small.

Figure 8C:
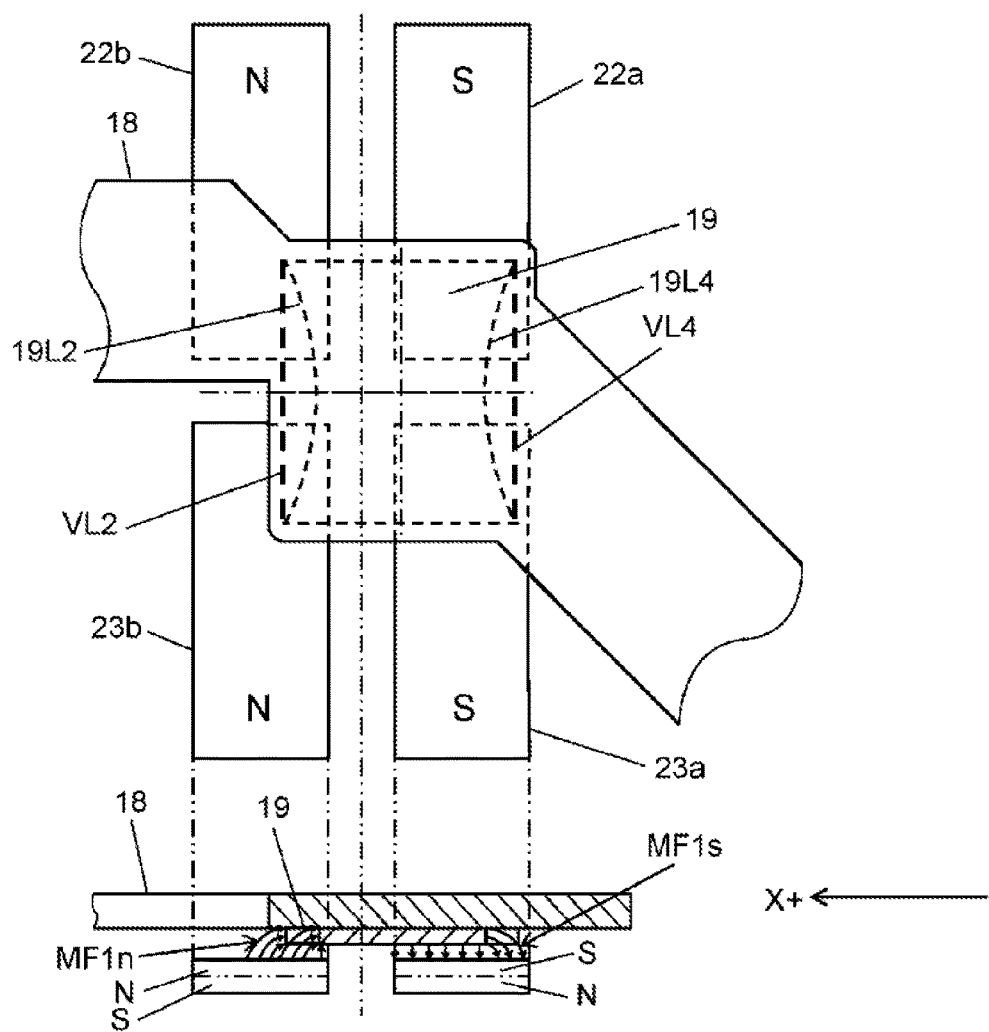
FIG. 8C is a view illustrating a state in which the irregular-shaped attraction plate is displaced toward the other side with respect to the sensor magnets in the image blur correction device according to the first exemplary embodiment of the present disclosure.

FIG. 8C illustrates the state in which the attraction plate is displaced in the X− direction. If the attraction plate is rectangular, the end face of side VL4 in the X− direction is located near the end faces of sensor magnets 22a, 23a. Therefore, leakage magnetic flux MF1s applied to the end face of side VL4 is smaller than leakage magnetic flux MF1n applied to the end face of side VL2 facing side VL4. Accordingly, force for returning in the X+ direction is exerted on the attraction plate due to the difference in the attraction force. On the other hand, in irregular-shaped attraction plate 19, the end face of side 19L4 in the X− direction is located near the end faces of sensor magnets 22a, 23a, but due to the recessed shape, leakage magnetic flux MF1s applied on the end face of side 19L3 is larger than that of the rectangular attraction plate. Thus, the returning force in the X+ direction due to the difference in the attraction force is relatively small.

As described above, irregular-shaped attraction plate 19 has the characteristic in which, even if the displacement amount with respect to sensor magnets 22a and 22b, 23a and 23b is increased, the change in the force for returning to the magnetic equilibrium position in the direction orthogonal to optical axis AX is small, although the attraction force in the direction of optical axis AX is reduced in the same level as the rectangular attraction plate. In irregular-shaped attraction plate 19, attraction force is generated in proportion to the area of irregular-shaped attraction plate 19. Therefore, leakage magnetic flux in the thickness direction of irregular-shaped attraction plate 19 is increased due to the displacement of irregular-shaped attraction plate 19, so that the attraction force for the magnets on one side is increased. However, as the extent of the reduction in leakage magnetic flux by the magnets on the other side is smaller than that in the rectangular attraction plate, the difference in the attraction force according to the displacement amount of irregular-shaped attraction plate 19 is decreased. Accordingly, when being displaced, irregular-shaped attraction plate 19 has smaller returning force in the direction orthogonal to optical axis AX than the rectangular attraction plate.

Consequently, the variation in the returning force of irregular-shaped attraction plate 19 is mild, and hence the control to change the electric supply to the actuators according to the detection of the displacement amount is facilitated.

[1-3. Modifications]

Figure 9A:
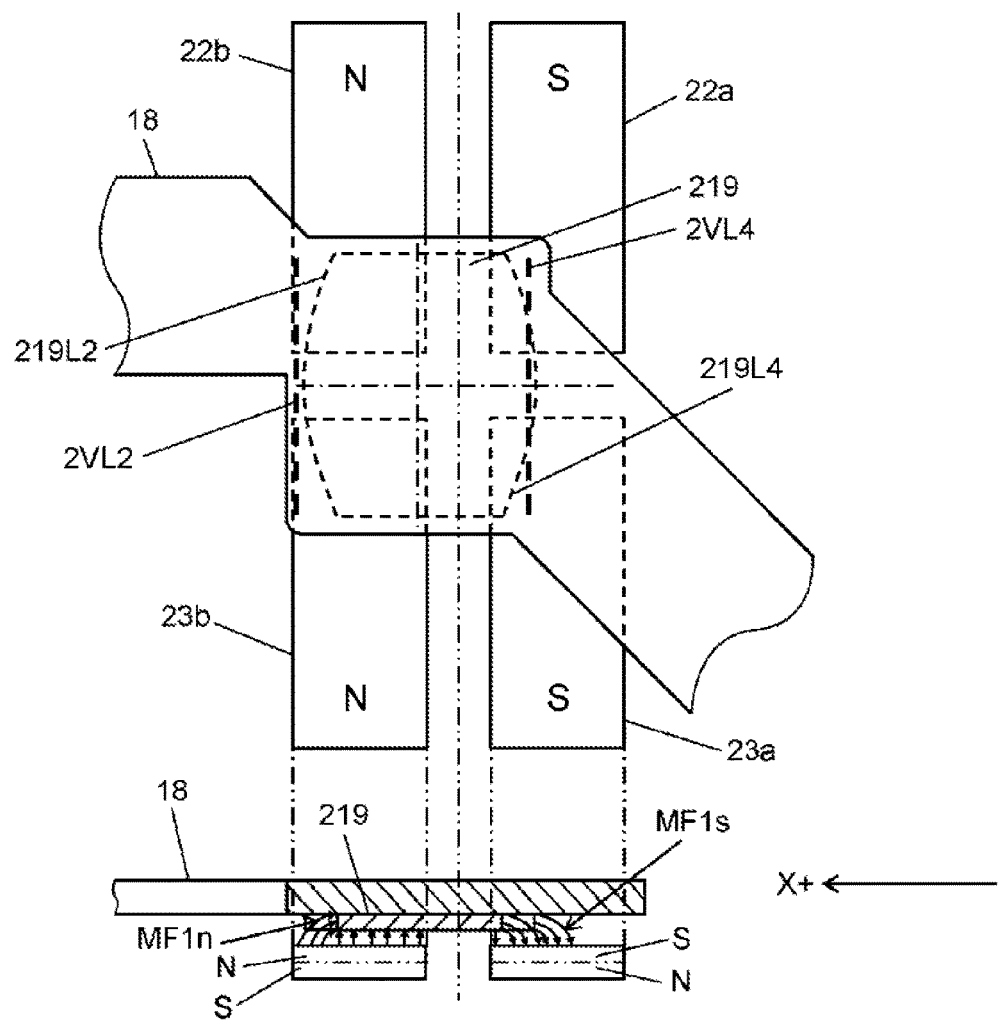
FIG. 9A is a view illustrating a state in which an irregular-shaped attraction plate according to a modification of the first exemplary embodiment of the present disclosure is displaced toward one side with respect to sensor magnets.
Figure 9B:
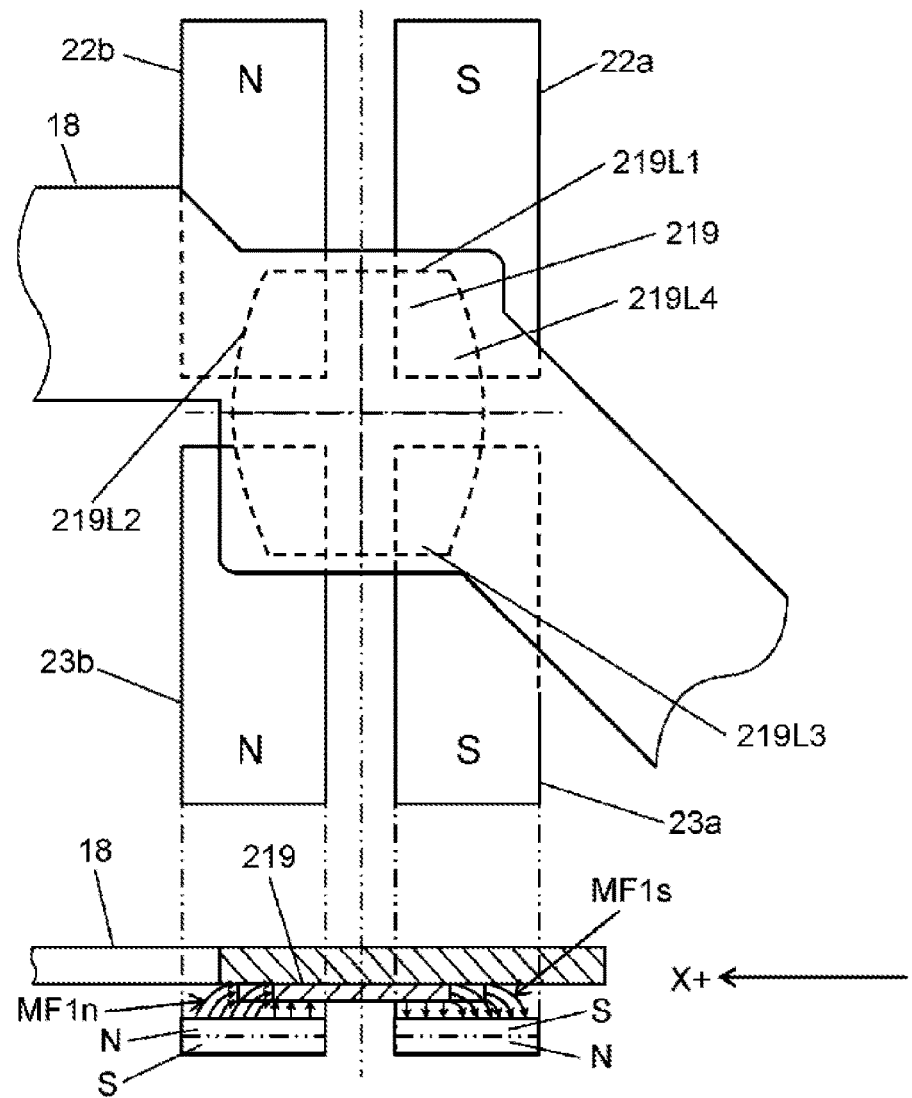
FIG. 9B is a view illustrating a state in which the irregular-shaped attraction plate according to the modification of the first exemplary embodiment of the present disclosure is located on a central position with respect to the sensor magnets.
Figure 9C:
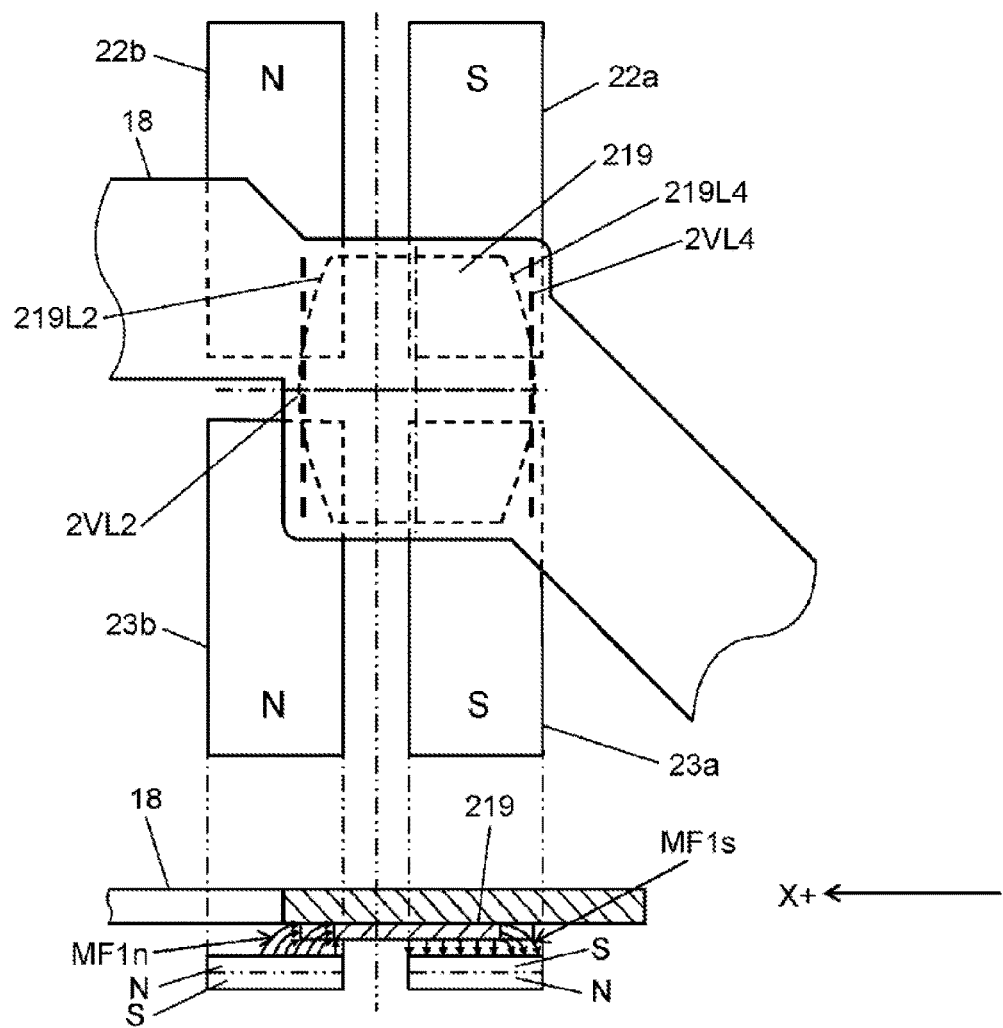
FIG. 9C is a view illustrating a state in which the irregular-shaped attraction plate according to the modification of the first exemplary embodiment of the present disclosure is displaced toward the other side with respect to the sensor magnets.

FIG. 9A is a view illustrating a state in which irregular-shaped attraction plate 219 according to a modification of the first exemplary embodiment of the present disclosure is displaced toward one side with respect to sensor magnets 22a, 22b, 23a, 23b. FIG. 9B is a view illustrating a state in which irregular-shaped attraction plate 219 is located on the center with respect to sensor magnets 22a, 22b, 23a, 23b. FIG. 9C is a view illustrating a state in which irregular-shaped attraction plate 219 is displaced toward the other side with respect to sensor magnets 22a, 22b, 23a, 23b.

Irregular-shaped attraction plate 219 may be configured such that a pair of facing sides out of four sides of the attraction plate is formed to have a protruded circular arc as illustrated in FIGS. 9A to 9C.

FIG. 9B illustrates the state in which irregular-shaped attraction plate 219 according to the present modification is in a magnetic equilibrium position. As illustrated in FIG. 9B, irregular-shaped attraction plate 219 has a flat surface facing sensor magnets 22a, 22b, 23a, 23b. Out of four sides of the flat surface, linear side 219L1 (one example of a first side) is located across S-pole sensor magnet 22a and N-pole sensor magnet 22b. Linear side 219L3 (one example of a third side) facing side 219L1 is located across S-pole sensor magnet 23a and N-pole sensor magnet 23b. Protrusion-shaped side 219L2 (one example of a second side) intersecting side 219L1 is located across N-pole sensor magnet 22b and N-pole sensor magnet 23b. Side 219L4 (one example of a fourth side) facing side 219L2 is located across S-pole sensor magnet 22a and N-pole sensor magnet 23a.

FIG. 9A illustrates the state in which the attraction plate according to the present modification is displaced in the X+ direction. If the attraction plate is rectangular, the end face of side 2VL2 in the X+ direction is located near the end faces of sensor magnets 22b, 23b. Therefore, leakage magnetic flux MF1n applied to the end face of side 2VL2 is smaller than leakage magnetic flux MF1s applied to the end face of side 2VL4 facing side 2VL2. Accordingly, force for returning in the X− direction is exerted on the attraction plate due to the difference in the attraction force. On the other hand, in irregular-shaped attraction plate 219, the end face of side 219L2 in the X+ direction is located near the end faces of sensor magnets 22b, 23b, but due to the protruded shape, leakage magnetic flux MF1n applied on the end face of side 219L2 is larger than that of the rectangular attraction plate. Thus, the returning force in the X− direction due to the difference in the attraction force is relatively small.

FIG. 9C illustrates the state in which the attraction plate is displaced in the X− direction. If the attraction plate is rectangular, the end face of side 2VL4 in the X− direction is located near the end faces of sensor magnets 22a, 23a. Therefore, leakage magnetic flux MF1s applied to the end face of side 2VL4 is smaller than leakage magnetic flux MF1n applied to the end face of side 2VL2 facing side 2VL4. Accordingly, force for returning in the X+ direction is exerted on the attraction plate due to the difference in the attraction force. On the other hand, in irregular-shaped attraction plate 219, the end face of side 219L4 in the X− direction is located near the end faces of sensor magnets 22a, 23a, but due to the protruded shape, leakage magnetic flux MF1s applied on the end face of side 219L4 is larger than that of the rectangular attraction plate. Thus, the returning force in the X+ direction due to the difference in the attraction force is relatively small.

Consequently, as the variation in the returning force of irregular-shaped attraction plate 219 is mild, the control to change the electric supply to the actuators according to the detection of the displacement amount is extremely facilitated.

[1-4. Characteristics, Etc.]

Image blur correction device 1 according to the present exemplary embodiment is an image blur correction device that corrects a blur of a subject image to be captured, and includes the following: a fixed frame corresponding to fixed holding member 21; movable frame 11; a plurality of connection members corresponding to a plurality of ball members 31a, 31b, 31c; a plurality of actuators corresponding to drive coils 15, 16, 17 and drive magnets 25a and 25b, 27a and 26b, 27a and 27b; a pair of magnets corresponding to sensor magnets 22a, 22b, 23a, 23b; and a magnetic body corresponding to irregular-shaped attraction plate 19, 219. Movable frame 11 is displaceable along a plane orthogonal to an optical axis. The fixed frame faces movable frame 11. The plurality of connection members corresponding to ball members 31a, 31b, 31c connects the fixed frame corresponding to fixed holding member 21 and movable frame 11 to each other and supports movable frame 11 so as to be displaceable. The plurality of actuators corresponding to drive coils 15, 16, 17 and to drive magnets 25a and 25b, 27a and 26b, 27a and 27b changes the position of movable frame 11 according to displacement of movable frame 11. The pair of magnets corresponding to sensor magnets 22a, 22b, 23a, 23b is mounted on one of the fixed frame corresponding to fixed holding member 21 and movable frame 11, and has a first magnetic pole corresponding to an S pole and a second magnetic pole corresponding to an N pole. The magnetic body corresponding to irregular-shaped attraction plate 19, 219 is mounted on the other of the fixed frame corresponding to fixed holding member 21 and movable frame 11 so as to face the pair of magnets corresponding to sensor magnets 22a, 22b, 23a, 23b. The magnetic body corresponding to irregular-shaped attraction plate 19, 219 has a flat surface facing the pair of magnets corresponding to sensor magnets 22a, 22b, 23a, 23b, the flat surface having four sides. Out of the four sides, first side 19L1, 219L1 is located across the first magnetic pole corresponding to the S pole of the pair of magnets corresponding to sensor magnets 22a, 22b and the second magnetic pole corresponding to the N pole of this pair of magnets; and second side 19L2, 219L2 intersecting first side 19L1, 219L1 is located along one of the first magnetic pole corresponding to the S pole of the pair of magnets corresponding to sensor magnets 22b, 23b and the second magnetic pole corresponding to the N pole of this pair of magnets. First side 19L1, 219L1 is linear, and second side 19L2, 219L2 has a recessed shape or a protruded shape intersecting first side 19L1, 219L1. A number of the plurality of connection members corresponding to ball members 31a, 31b, 31c is three or more. The magnetic body corresponding to irregular-shaped attraction plate 19, 219 is disposed in a region formed by line segments which connect each of the plurality of connection members corresponding to ball members 31a, 31b, 31c.

In image blur correction device 1, even if the displacement amount of irregular-shaped attraction plate 19, 219 with respect to sensor magnets 22a and 22b, 23a and 23b is increased as illustrated in FIGS. 8A and 9A, for example, a leakage magnetic flux in the thickness direction of irregular-shaped attraction plate 19, 219 is increased, and thus, the attraction force to sensor magnet 22a or 23a on one side is increased. However, the reduction in the leakage magnetic flux by sensor magnets 22b and 23b on the other side is suppressed. Therefore, the difference in the attraction force according to the displacement amount of irregular-shaped attraction plate 19, 219 is small. Accordingly, even when displaced, irregular-shaped attraction plate 19, 219 has small returning force for returning to the magnetic equilibrium position in the direction orthogonal to optical axis AX. Consequently, imaging element 12 which is movable can stably be attracted in the direction of optical axis AX in the image blur correction function. Thus, the control for the actuators for performing image blur correction is facilitated. Consequently, image blur correction with higher performance can be implemented.

In addition, image blur correction device 1 may include a plurality of pairs of magnets corresponding to sensor magnets 22a, 22b, 23a, 23b, each magnet of a pair of magnets corresponding to sensor magnets 22a, 22b, 23a, 23b having a first magnetic pole corresponding to an S pole and a second magnetic pole corresponding to an N pole. Further, image blur correction device 1 may include a plurality of displacement detectors corresponding to magnetic displacement detection sensors 14a, 14b, 14c, the displacement detectors being mounted on the other of the fixed frame corresponding to fixed holding member 21 and movable frame 11 so as to face the plurality of pairs of magnets corresponding to sensor magnets 22a, 22b, 23a, 23b for detecting the displacement of movable frame 11 based on a change in magnetic fluxes of the plurality of pairs of magnets corresponding to sensor magnets 22a, 22b, 23a, 23b. According to this configuration, stable attraction force by the magnetic body corresponding to irregular-shaped attraction plate 19, 219 can be maintained even when imaging element 12 is displaced.

In addition, movable frame 11, the displacement detectors corresponding to magnetic displacement detection sensors 14a, 14b, 14c, the magnetic body corresponding to irregular-shaped attraction plate 19, 219, and the pair of magnets corresponding to sensor magnets 22a and 22b, 23a and 23b, 24a and 24b may be disposed along the direction of the optical axis in this order. According to this configuration, stable attraction force by the magnetic body corresponding to irregular-shaped attraction plate 19, 219 can be maintained even when imaging element 12 is displaced.

In addition, the magnetic body corresponding to irregular-shaped attraction plate 19, 219 may be disposed to press movable frame 11 against the connection members corresponding to ball members 31a, 31b, 31c by being attracted by the pair of magnets corresponding to sensor magnets 22a, 22b, 23a, 23b. According to this configuration, the connection members corresponding to ball members 31a, 31b, 31c can be biased toward one of the fixed frame corresponding to fixed holding member 21 and movable frame 11.

In addition, the magnetic body corresponding to irregular-shaped attraction plate 19, 219 may be configured such that, out of the four sides, third side 19L3, 219L3 facing first side 19L1, 219L1 is located across the first magnetic pole corresponding to the S pole of the pair of magnets corresponding to sensor magnets 23a and 23b and the second magnetic pole corresponding to the N pole of this pair of magnets; fourth side 19L4, 219L4 facing second side 19L2, 219L2 is located along the other of the first magnetic pole corresponding to the N pole of the pair of magnets corresponding to sensor magnets 22a, 22b, 23a, 23b and the second magnetic pole corresponding to the S pole of this pair of magnets; third side 19L3, 219L3 is linear; and fourth side 19L4, 219L4 has a recessed shape or a protruded shape intersecting third side 19L3, 219L3. According to this configuration, imaging element 12 which is movable can stably be attracted in the direction of optical axis AX in the image blur correction function. Thus, the control for the actuators for performing image blur correction is facilitated. Consequently, image blur correction with higher performance can be implemented.

In addition, the displacement detectors corresponding to magnetic displacement detection sensors 14a, 14b, 14c may detect a displacement amount and a displacement direction of movable frame 11, and the actuators corresponding to drive coils 15, 16, and 17 and drive magnets 25a and 25b, 26a and 26b, 27a and 27b may change the position of movable frame 11 according to the displacement amount and the displacement direction, which have been detected, of movable frame 11. According to this configuration, an image blur caused by the movement of camera body 101 can be corrected.

In addition, the flat surface of the magnetic body corresponding to irregular-shaped attraction plate 19, 219 may have a line-symmetric shape. According to this configuration, imaging element 12 which is movable can stably be attracted in the direction of optical axis AX in the image blur correction function. Thus, the control for the actuators for performing image blur correction is facilitated. Consequently, image blur correction with higher performance can be implemented.

In addition, image blur correction device 1 according to the present exemplary embodiment is an image blur correction device that corrects a blur of a subject image to be captured, and includes the following: a fixed frame corresponding to fixed holding member 21; movable frame 11; a plurality of connection members corresponding to a plurality of ball members 31a, 31b, 31c; a plurality of actuators corresponding to drive coils 15, 16, 17 and drive magnets 25a and 25b, 27a and 26b, 27a and 27b; a pair of magnets corresponding to sensor magnets 22a, 22b, 23a, 23b; and a magnetic body corresponding to irregular-shaped attraction plate 19, 219. Movable frame 11 is displaceable along a plane orthogonal to an optical axis. The fixed frame faces movable frame 11. The plurality of connection members corresponding to ball members 31a, 31b, 31c connects the fixed frame corresponding to fixed holding member 21 and movable frame 11 to each other and supports movable frame 11 so as to be displaceable. The plurality of actuators corresponding to drive coils 15, 16, 17 and drive magnets 25a and 25b, 27a and 26b, 27a and 27b changes the position of movable frame 11 according to displacement of movable frame 11. The pair of magnets corresponding to sensor magnets 22a, 22b, 23a, 23b is mounted on one of the fixed frame corresponding to fixed holding member 21 and movable frame 11, and has a first magnetic pole corresponding to an S pole and a second magnetic pole corresponding to an N pole. The magnetic body corresponding to irregular-shaped attraction plate 19, 219 is mounted on the other of the fixed frame corresponding to fixed holding member 21 and movable frame 11 so as to face the pair of magnets corresponding to sensor magnets 22a, 22b, 23a, 23b. The pair of magnets corresponding to sensor magnets 22a, 22b, 23a, 23b has a first pair of magnets corresponding to sensor magnets 22a, 22b and a second pair of magnets corresponding to sensor magnets 23a, 23b. The magnetic body corresponding to irregular-shaped attraction plate 19, 219 has a flat surface facing the first pair of magnets corresponding to sensor magnets 22a, 22b and the second pair of magnets corresponding to sensor magnets 23a, 23b, the flat surface having four sides. Out of the four sides, first side 19L1, 219L1 is located across the first magnetic pole corresponding to the S pole of the first pair of magnets corresponding to sensor magnets 22a, 22b and the second magnetic pole corresponding to the N pole of this first pair of magnets.

Second side 19L2, 219L2 intersecting first side 19L1, 219L1 is located across the first magnetic pole corresponding to the S pole of the first pair of magnets corresponding to sensor magnets 22a, 22b and the first magnetic pole corresponding to the S pole of the second pair of magnets corresponding to sensor magnets 23a, 23b. First side 19L1, 219L1 is linear, and second side 19L2, 219L2 has a recessed shape or a protruded shape intersecting first side 19L1, 219L1. A number of the plurality of connection members corresponding to ball members 31a, 31b, 31c is three or more. The magnetic body corresponding to irregular-shaped attraction plate 19, 219 is disposed in a region formed by line segments which connect each of the plurality of connection members corresponding to ball members 31a, 31b, 31c.

According to this configuration, imaging element 12 which is movable can stably be attracted in the direction of optical axis AX in the image blur correction function. Thus, the control for the actuators for performing image blur correction is facilitated. Consequently, image blur correction with higher performance can be implemented.

In addition, in the magnetic body corresponding to irregular-shaped attraction plate 19, 219, third side 19L3, 219L3, out of the four sides, facing first side 19L1, 219L1 is located across the first magnetic pole corresponding to the S pole of the second pair of magnets corresponding to sensor magnets 23a, 23b and the second magnetic pole corresponding to the N pole of this second pair of magnets. Fourth side 19L4, 219L4 facing second side 19L2, 219L2 is located across the second magnetic pole corresponding to the N pole of the first pair of magnets corresponding to sensor magnets 22a, 22b and the second magnetic pole corresponding to the N pole of the second pair of magnets corresponding to sensor magnets 23a, 23b. Third side 19L3, 219L3 is linear, and fourth side 19L4, 219L4 has a recessed shape or a protruded shape intersecting third side 19L3, 219L3. According to this configuration, imaging element 12 which is movable can stably be attracted in the direction of optical axis AX in the image blur correction function. Thus, the control for the actuators for performing image blur correction is facilitated. Consequently, image blur correction with higher performance can be implemented.

In addition, a number of the plurality of actuators corresponding to drive coils 15, 16, 17 and drive magnets 25a and 25b, 26a and 26b, 27a and 27b, a number of the plurality of displacement detectors corresponding to magnetic displacement detection sensors 14a, 14b, 14c, and a number of the plurality of pairs of magnets corresponding to sensor magnets 22a, 22b, 23a, 23b may respectively be three or more. According to this configuration, imaging element 12 which is movable can stably be attracted in the direction of optical axis AX in the image blur correction function. Thus, the control for the actuators for performing image blur correction is facilitated. Consequently, image blur correction with higher performance can be implemented.

In addition, an imaging device corresponding to digital camera 100 according to the present exemplary embodiment may include image blur correction device 1 and imaging element 12 that converts an optical image of a subject into an electric signal. In addition, movable frame 11 may hold imaging element 12 so as to be displaceable along a facing surface of movable frame 11. According to this configuration, an imaging device having an image blur correction function with higher performance can be provided.

In addition, an imaging device corresponding to digital camera 100 according to the present exemplary embodiment may include image blur correction device 1 and a plurality of optical systems that converges light from a subject. In addition, movable frame 11 may hold one of the optical systems so as to be displaceable along a facing surface of movable frame 11. According to this configuration, an imaging device having an image blur correction function with higher performance can be provided.

As described above, the first exemplary embodiment has been described above as an example of the technology in the present disclosure. However, the technology in the present disclosure is not limited to this example, and may be also applied to other exemplary embodiments appropriately subjected to modifications, replacements, addition, or omissions.

Other Exemplary Embodiments

Hereinafter, other exemplary embodiments will be described.

[1]

The shape of irregular-shaped attraction plate 19, 219 in the first exemplary embodiment is not limited to a circular arc. The similar effect can be obtained, so long as irregular-shaped attraction plate 19, 219 has a recessed shape or a protruded shape with respect to the direction in which the returning force of irregular-shaped attraction plate 19, 219 is applied.

Figure 10A:
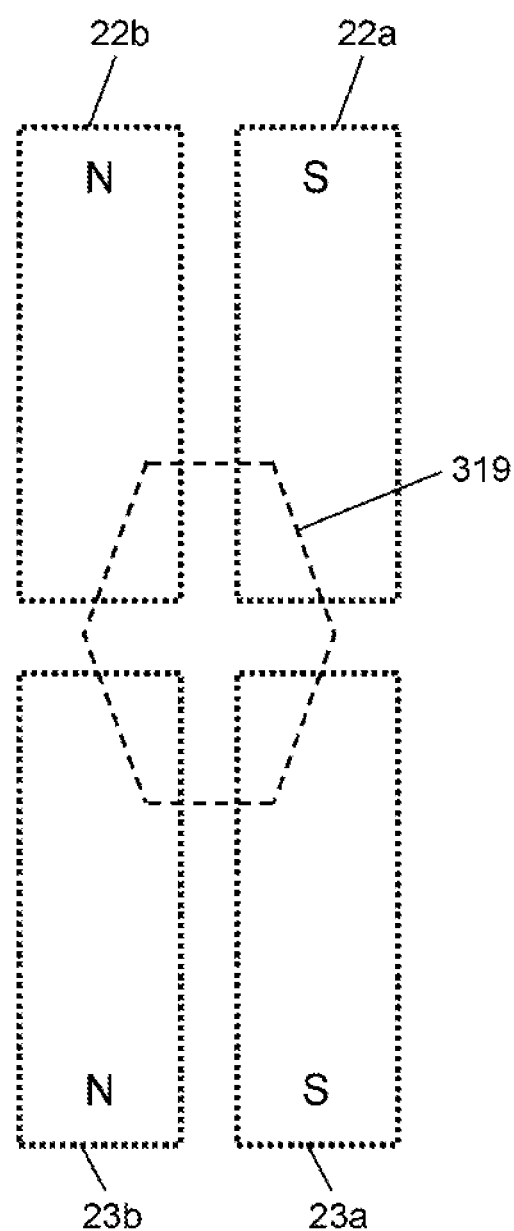
FIG. 10A is a view illustrating an irregular-shaped attraction plate according to another exemplary embodiment of the present disclosure.
Figure 10B:
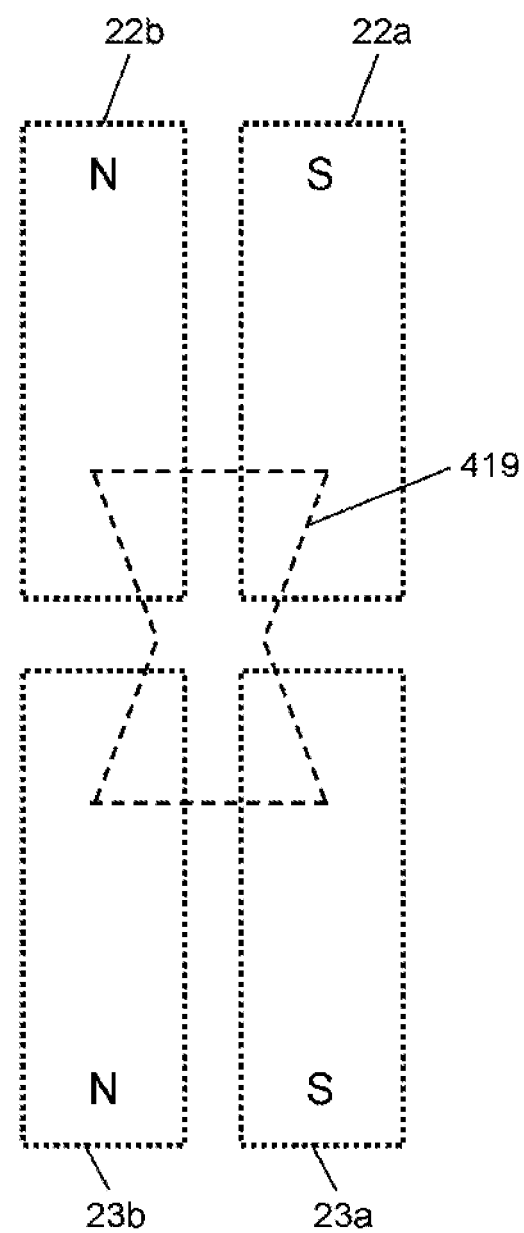
FIG. 10B is a view illustrating another irregular-shaped attraction plate according to another exemplary embodiment of the present disclosure.
Figure 10C:
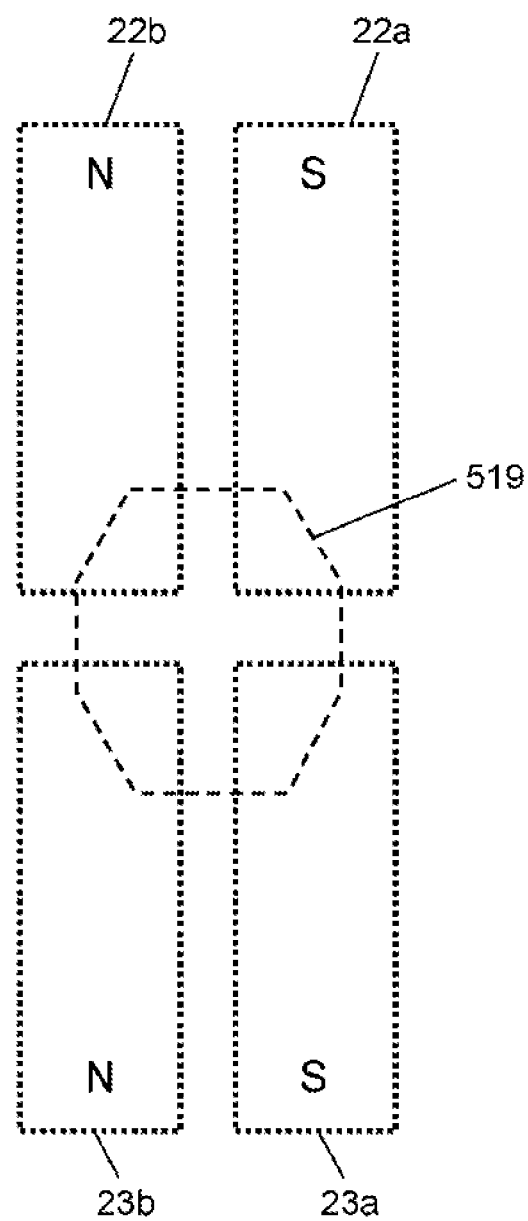
FIG. 10C is a view illustrating still another irregular-shaped attraction plate according to another exemplary embodiment of the present disclosure.

FIG. 10A is a view illustrating an irregular-shaped attraction plate according to another exemplary embodiment of the present disclosure. FIG. 10B is a view illustrating another irregular-shaped attraction plate according to another exemplary embodiment of the present disclosure. FIG. 10C is a view illustrating still another irregular-shaped attraction plate according to another exemplary embodiment of the present disclosure. Irregular-shaped attraction plate 19, 219 may have an irregular shape partially having a straight line, as in irregular-shaped attraction plate 319 illustrated in FIG. 10A, irregular-shaped attraction plate 419 illustrated in FIG. 10B, and irregular-shaped attraction plate 519 illustrated in FIG. 10C.

[2]

While the first exemplary embodiment describes an image blur correction device of a type in which an imaging element is driven as one example, the image blur correction device according to the present disclosure is applicable to a lens shift system. For example, a plurality of irregular-shaped attraction plates is fixed on the circumferential surface of a doughnut-shaped lens frame (movable frame) that holds an image blur correction lens on the center of the lens frame, and sensor magnets are provided on a facing doughnut-shaped fixed frame. In the image blur correction device described above, when the movable frame is displaced in the direction orthogonal to the optical axis with respect to the fixed frame, the force for returning the movable frame to the magnetic equilibrium position can also be suppressed due to the action of the irregular-shaped attraction plates. Consequently, the image blur correction operation can stably be executed.

[3]

The examples illustrated in FIGS. 8A to 8C and 9A to 9C show the displacement of irregular-shaped attraction plate 19, 219 in the X direction. However, the present disclosure is also applicable to the displacement in the Y direction. In this case, the arrangement of irregular-shaped attraction plates 19, 219 and sensor magnets 22a, 22b, 23a, 23b with respect to the X direction illustrated in FIGS. 8A to 8C and 9A to 9C is changed to an arrangement with respect to the Y direction.

[4]

A pair of sensor magnets may be provided as the sensor magnets facing irregular-shaped attraction plate 19, 219. In this case, the pair of sensor magnets has an S pole and an N pole. Irregular-shaped attraction plate 19, 219 has a flat surface facing the pair of sensor magnets. Out of the four sides forming the flat surface, a linear first side, a third side facing the first side, or both of the first side and the third side are located across the S pole and the N pole. A recessed or protruded second side intersecting the first side, a fourth side facing the second side, or both of the second side and the fourth side are located along the N pole or the S pole. Irregular-shaped attraction plate 19, 219 is disposed such that the center of this plate is aligned with an intermediate point of the pair of magnets along the optical axis.

According to the configuration described above, the effect similar to the effect obtained by the first exemplary embodiment is also obtained.

[5]

While sensor magnets 22a, 22b, 23a, 23b, 24a, 24b are provided on fixed holding member 21 in the first exemplary embodiment, they may be provided on movable frame 11. In this case, at least corresponding magnetic displacement detection sensors 14a, 14b, 14c and irregular-shaped attraction plates 19, 219 are provided on fixed holding member 21.

[6]

While digital camera 100 illustrated in FIGS. 1 and 2 has been described as an example of a digital camera, the digital camera is not limited to this example. A camera system to which an image blur correction device of a sensor shift type or a lens shift type can be mounted may be employed.

[7]

The actuators may be implemented by using a piezoelectric actuator.

The displacement detection mechanism may be implemented by an angular speed sensor or the like.

As described above, in the present exemplary embodiment, the second side may have a circular arc shape, a triangular shape, or a trapezoidal shape. According to this configuration, the control for the actuators for performing image blur correction is facilitated. Consequently, image blur correction with higher performance can be implemented.

According to the present disclosure, an imaging device having an image blur correction function with higher performance can be provided.

What is claimed is:
1. An image blur correction device that corrects a blur of a subject image to be captured,
the image blur correction device comprising:
a movable frame that is displaceable along a plane orthogonal to an optical axis;
a fixed frame that faces the movable frame;
a plurality of connection members that connects the fixed frame and the movable frame to each other and supports the movable frame so as to be displaceable;
a plurality of actuators that changes a position of the movable frame according to displacement of the movable frame;
a pair of magnets that is mounted on one of the fixed frame and the movable frame and has a first magnetic pole and a second magnetic pole; and
a magnetic body that is mounted on the other of the fixed frame and the movable frame so as to face the pair of magnets, wherein
the magnetic body has a flat surface facing the pair of magnets, the flat surface having four sides,
a first side out of the four sides is located across the first magnetic pole and the second magnetic pole of the pair of magnets,
a second side intersecting the first side is located along one of the first magnetic pole and the second magnetic pole of the pair of magnets,
the first side is linear, the second side has a recessed shape or a protruded shape intersecting the first side,
a number of the plurality of connection members is three or more, and
the magnetic body is disposed in a region formed by line segments which connect each of the plurality of connection members.

2. The image blur correction device according to claim 1, further comprising:
a plurality of pairs of magnets including the pair of magnets, each magnet having a first magnetic pole and a second magnetic pole; and
a plurality of displacement detectors which is mounted on the other of the fixed frame and the movable frame so as to face the plurality of pairs of magnets and which detects displacement of the movable frame based on a change in magnetic fluxes of the plurality of pairs of magnets.

3. The image blur correction device according to claim 2, wherein
the movable frame, the displacement detectors, the magnetic body, and the pair of magnets are disposed in this order along a direction of the optical axis.

4. The image blur correction device according to claim 1, wherein
the magnetic body is disposed to press the movable frame against the connection members by being attracted by the pair of magnets.

5. The image blur correction device according to claim 1, wherein
in a state in which the movable frame is not displaced, the magnetic body is disposed such that a center of the flat surface of the magnetic body is aligned with an intermediate point of the pair of magnets along the optical axis.

6. The image blur correction device according to claim 1, wherein
the magnetic body is further configured such that, out of the four sides, a third side facing the first side is located across the first magnetic pole and the second magnetic pole of the pair of magnets, a fourth side facing the second side is located along the other of the first magnetic pole and the second magnetic pole of the pair of magnets, the third side is linear, and the fourth side has a recessed shape or a protruded shape intersecting the third side.

7. The image blur correction device according to claim 2, wherein
the displacement detectors detect a displacement amount and a displacement direction of the movable frame, and
the actuators change a position of the movable frame according to the displacement amount and the displacement direction of the movable frame which have been detected.

8. The image blur correction device according to claim 1, wherein
the second side has a circular arc shape, a triangular shape, or a trapezoidal shape.

9. The image blur correction device according to claim 1, wherein
the flat surface of the magnetic body has a line-symmetric shape.

10. An image blur correction device that corrects a blur of a subject image to be captured,
the image blur correction device comprising:
a movable frame that is displaceable along a plane orthogonal to an optical axis;
a fixed frame that faces the movable frame;
a plurality of connection members that connects the fixed frame and the movable frame to each other and supports the movable frame so as to be displaceable;
a plurality of actuators that changes a position of the movable frame according to displacement of the movable frame;
a pair of magnets that is mounted on one of the fixed frame and the movable frame and has a first magnetic pole and a second magnetic pole; and
a magnetic body that is mounted on the other of the fixed frame and the movable frame so as to face the pair of magnets,
wherein
the pair of magnets includes a first pair of magnets and a second pair of magnets,
the magnetic body has a flat surface facing the first pair of magnets and the second pair of magnets, the flat surface having four sides,
a first side out of the four sides is located across the first magnetic pole and the second magnetic pole of the first pair of magnets,
a second side intersecting the first side is located across the first magnetic pole of the first pair of magnets and the first magnetic pole of the second pair of magnets,
the first side is linear, the second side has a recessed shape or a protruded shape intersecting the first side,
a number of the plurality of connection members is three or more, and
the magnetic body is disposed in a region formed by line segments which connect each of the plurality of connection members.

11. The image blur correction device according to claim 10, wherein
the magnetic body is further configured such that,
out of the four sides, a third side facing the first side is located across the first magnetic pole and the second magnetic pole of the second pair of magnets,
a fourth side facing the second side is located across the second magnetic pole of the first pair of magnets and the second magnetic pole of the second pair of magnets, and
the third side is linear, and the fourth side has a recessed shape or a protruded shape intersecting the third side.

12. The image blur correction device according to claim 2, wherein
a number of the plurality of actuators, a number of the plurality of displacement detectors, and a number of the plurality of pairs of magnets are respectively three or more.

13. An imaging device comprising:
the image blur correction device according to claim 1; and
an imaging element that converts an optical image of the subject into an electric signal,
wherein
the movable frame holds the imaging element so as to be displaceable along a facing surface of the movable frame.

14. An imaging device comprising:
the image blur correction device according to claim 1; and
a plurality of optical systems that converges light from the subject,
wherein
the movable frame holds one of the optical systems so as to be displaceable along a facing surface of the movable frame.

\* \* \* \* \*